(12) United States Patent
Schwieger et al.

(10) Patent No.: US 11,229,898 B2
(45) Date of Patent: Jan. 25, 2022

(54) NANOMETER-SIZE ZEOLITIC PARTICLES AND METHOD FOR THE PRODUCTION THEREOF

(71) Applicant: Friedrich-Alexander-Universität Erlangen-Nürnberg, Erlangen (DE)

(72) Inventors: Wilhelm Schwieger, Spardorf (DE); Albert Gonche Fortunatus Machoke, Erlangen (DE)

(73) Assignee: Friedrich-Alexander-Universität Erlangen-Nürnberg, Erlangen (DE)

( * ) Notice: Subject to any disclaimer, the term of this patent is extended or adjusted under 35 U.S.C. 154(b) by 159 days.

(21) Appl. No.: 16/064,607

(22) PCT Filed: Dec. 28, 2016

(86) PCT No.: PCT/EP2016/082754
§ 371 (c)(1),
(2) Date: Dec. 20, 2018

(87) PCT Pub. No.: WO2017/114853
PCT Pub. Date: Jul. 6, 2017

(65) Prior Publication Data
US 2019/0126258 A1 May 2, 2019

(30) Foreign Application Priority Data
Dec. 29, 2015 (DE) ...................... 10 2015 016 908.4

(51) Int. Cl.
| | | |
|---|---|---|
| *B01J 29/06* | (2006.01) | |
| *B01J 29/44* | (2006.01) | |
| *B01J 37/10* | (2006.01) | |
| *B01J 35/08* | (2006.01) | |
| *B01J 37/00* | (2006.01) | |
| *B01J 35/10* | (2006.01) | |
| *B01J 35/02* | (2006.01) | |
| *C01B 39/40* | (2006.01) | |
| *B01J 29/03* | (2006.01) | |
| *C01B 39/04* | (2006.01) | |
| *B01J 37/30* | (2006.01) | |
| *B01J 29/40* | (2006.01) | |
| *C01B 37/02* | (2006.01) | |
| *B01J 20/18* | (2006.01) | |

(Continued)

(52) U.S. Cl.
CPC ............. *B01J 29/44* (2013.01); *B01J 20/18* (2013.01); *B01J 20/28007* (2013.01); *B01J 20/28019* (2013.01); *B01J 20/3057* (2013.01); *B01J 20/3078* (2013.01); *B01J 20/3204* (2013.01); *B01J 20/3236* (2013.01); *B01J 20/3293* (2013.01); *B01J 29/0308* (2013.01); *B01J 29/40* (2013.01); *B01J 35/0013* (2013.01); *B01J 35/023* (2013.01); *B01J 35/08* (2013.01); *B01J 35/1033* (2013.01); *B01J 35/1057* (2013.01); *B01J 35/1061* (2013.01); *B01J 37/0018* (2013.01); *B01J 37/0072* (2013.01); *B01J 37/0201* (2013.01); *B01J 37/10* (2013.01); *B01J 37/30* (2013.01); *C01B 37/02* (2013.01); *C01B 39/04* (2013.01); *C01B 39/40* (2013.01); *B01J 29/85* (2013.01); *B01J 29/86* (2013.01); *B01J 29/87* (2013.01); *B01J 2229/10* (2013.01); *B01J 2229/186* (2013.01); *B01J 2229/34* (2013.01); *B01J 2229/36* (2013.01); *B01J 2229/38* (2013.01); *B01J 2229/42* (2013.01)

(58) Field of Classification Search
CPC ... B01J 29/40; B01J 29/44; B01J 29/86; B01J 29/87; B01J 29/85; B01J 2229/10; B01J 2229/186; B01J 2229/34; B01J 2229/36; B01J 2229/38; B01J 2229/42; B01J 35/023; B01J 35/08; B01J 35/1033; B01J 35/1057; B01J 35/1061; B01J 35/0013; B01J 37/0072; B01J 37/10; B01J 37/30; B01J 37/0018; B01J 37/0201; B01J 20/3078; B01J 20/3057; B01J 20/3293; B01J 20/28019; B01J 20/28007; B01J 20/18; B01J 20/3236; B01J 20/3204; C01B 39/04; C01B 39/40; C01B 37/02
USPC ........... 502/60, 400, 407, 414; 423/702, 716
See application file for complete search history.

(56) References Cited

U.S. PATENT DOCUMENTS

| | | |
|---|---|---|
| 4,800,187 A | 1/1989 | Lachman et al. |
| 5,248,643 A | 9/1993 | Patil et al. |

(Continued)

FOREIGN PATENT DOCUMENTS

| | | |
|---|---|---|
| CN | 1294030 | 5/2001 |
| CN | 102946997 | 2/2013 |

(Continued)

OTHER PUBLICATIONS

Egeblad et al., "Templating Mesoporous Zeolites," *Chem. Mater.*, 20:946-960, 2008.

(Continued)

*Primary Examiner* — Elizabeth D Wood
(74) *Attorney, Agent, or Firm* — Parker Highlander PLLC

(57) ABSTRACT

A particulate material and a process for the production thereof are provided, which particulate material comprises zeolitic particles having a crystalline structure, which contain as the main component a zeolite material having a zeolitic framework structure formed from Si, O and optionally Al, and/or a zeolite-like material having a zeolitic framework structure which is formed not only from Si, O and optionally Al, wherein the zeolitic particles are in the form of essentially spherical particles with nanometer dimensions.

7 Claims, 11 Drawing Sheets

(51) Int. Cl.
| | |
|---|---|
| B01J 20/28 | (2006.01) |
| B01J 20/30 | (2006.01) |
| B01J 20/32 | (2006.01) |
| B01J 35/00 | (2006.01) |
| B01J 37/02 | (2006.01) |
| B01J 29/85 | (2006.01) |
| B01J 29/86 | (2006.01) |
| B01J 29/87 | (2006.01) |

(56) References Cited

U.S. PATENT DOCUMENTS

| | | | |
|---|---|---|---|
| 5,723,397 | A | 3/1998 | Verduijn |
| 6,689,195 | B1 | 2/2004 | Anthonis et al. |
| 10,301,184 | B2 * | 5/2019 | Machoke ............... C01B 37/02 |
| 2005/0272592 | A1 | 12/2005 | Pinnavaia et al. |
| 2006/0073094 | A1 | 4/2006 | Miller et al. |
| 2011/0184206 | A1 | 7/2011 | Suzuki et al. |
| 2013/0225397 | A1 | 8/2013 | Ma et al. |
| 2014/0142361 | A1 | 5/2014 | Gaab et al. |
| 2017/0267537 | A1 | 9/2017 | Machoke et al. |

FOREIGN PATENT DOCUMENTS

| | | |
|---|---|---|
| CN | 103435065 | 12/2013 |
| CN | 103908975 | 7/2014 |
| CN | 104098110 | 10/2014 |
| DE | 3853402 | 10/1995 |
| DE | 69304018 | 2/1997 |
| DE | 69411905 | 3/1999 |
| DE | 69533513 | 11/2005 |
| DE | 69434846 | 3/2007 |
| DE | 10 2014 012681 | 2/2016 |
| EP | 1394113 | 3/2004 |
| EP | 2016/082754 | 7/2017 |
| EP | 2017/056533 | 9/2017 |
| JP | 2000/281333 | 10/2000 |
| JP | 2007/332004 | 12/2007 |
| JP | 2010/126397 | 6/2010 |
| RU | 2428251 | 9/2011 |
| RU | 2565599 | 10/2015 |
| WO | WO 92/19574 | 11/1992 |
| WO | WO 2011/073398 | 6/2011 |
| WO | WO 2016/026960 | 2/2016 |

OTHER PUBLICATIONS

Li et al., "Synthesis of hierarchical MFI zeolite microspheres with stacking nanocrystals," *Microporous and Macroporous Materials*, 117:104-110, 2009.

Machoke et al., "Micro/microporous system: MFI-type zeolite crystals with embedded macropores," *Adv. Mater.*, 27:1066-1070, 2015.

Majano et al., "Zeolite beta nanosized seemblies," *Microporous and Mesoporous Materials*, 80:227-235, 2005.

Matsukata et al., "Crystallization behavior of zeolite beta during steam-assisted crystallization of dry gel," *Microporous and Mesoporous Materials*, 56:1-10, 2002.

Möller et al., "One-step Synthesis of Hierarchical Zeolite Beta via Network Formation of Uniform Nanocrystals," *J. Am. Chem. Soc.*, 133:5284-5295, 2011.

Nakanishi, "Pore Structure Control of Silica Gels Based on Phase Seperation," *J. Porous Mat.*, 4:67-112, 1997.

Novelty Search Report provided by Swedish Patent and Registration Office, requested by applicant regarding the priority application, conducted on Jun. 23-24, 2015.

PCT International Preliminary Report on Patentability issued in International Application No. PCT/EP2016/082754, and English translation, dated Jul. 12, 2018.

PCT International Preliminary Report on Patentability issued in International Application No. PCT/EP2015/069254, dated Nov. 11, 2016. (English translation).

PCT International Search Report and Written Opinion issued in International Application No. PCT/EP2016/082754, dated May 15, 2017. (English translation).

PCT International Search Report and Written Opinion issued in International Application No. PCT/EP2015/069254, dated Dec. 18, 2015.

Search Report issued in German Application No. 10 2014 012 681, dated Mar. 19, 2015.

Search Report issued in German Application No. 10 2015 016 908, dated Aug. 30, 2016.

Serrano et al., "Synthesis strategies in the search for hierarchical zeolites," *Chem. Soc. Rev.*, 42:4004, 2013.

Tamon et al., "Synthesis of Zeolite Monolith with Hierarchical Micro/macropores by Ice-templating and Steam-assisted Crystallization," *Chem. Eng. Trans.*, 32:2059-2064, 2013.

Yang et al., "Layer-by-layer assembly of nanozeolite based on polymeric microsphere: zeolite coated sphere and hollow zeolite sphere," *Journal of Macromolecular Science, Part A—Pure and Applied Chemistry*, 39(6):509-526, 2002.

Yue et al., "Directly transforming as-synthesized MCM-41 to mesoporous MFI zeolite," *Journal of Materials Chemistry*, 18(17):2044-2050, 2008.

Zaarour et al., "Progress in zeolite synthesis promotes advanced applications," *Microporous and Mesoporous Materials*, 189:11-21, 2014.

Zhu et al., "Nanosized $CaCO_3$ as Hard Template for Creation of Intracrystal Pores within Silicalite-1 Crystal +," *Chem. Mat.*, 20(3): 1134-1139, 2007.

Office Action issued in counterpart Chinese Application No. 201680077361.3, dated Sep. 29, 2020, 18pgs.

PCT International Search Report and Written Opinion issued in International Application No. PCT/EP2017/056533, dated Jun. 16, 2017.

Zhang et al., "Novel two-layered zeolite NaA-silicalite-1 membranes," *Journal of Physics and Chemistry of Solids*, 66:1034-1038, 2005.

Jiao et al., "Controllable synthesis of ZSM-5 coatings on SiC foam support for MTP application," *Microporous and Mesoporous Materials*, 162:152-158, 2012.

Jiao et al., "Synthesis of highly accessible ZSM-5 coatings on SiC foam support," *Microporous and Mesoporous Materials*, 181: 201-207, 2013.

Office Action issued in Indian Application No. 201847039722, dated Jul. 17, 2020.

Machoke et al., "Micro/Macroporous system: MFI-type zeolite crystals with embedded macropores," *Adv. Mater.*, 27:1066-1070, 2015, Supporting Information, 6 pages.

* cited by examiner

Figure 12 (a and b)

Figure 14 (a and b)

NANOMETER-SIZE ZEOLITIC PARTICLES AND METHOD FOR THE PRODUCTION THEREOF

This application is a national phase application under 35 U.S.C. § 371 of International Application No. PCT/EP2016/082754, filed Dec. 28, 2016, which claims benefit of German Application No. 10 2015 016 908.4, filed Dec. 29, 2015, the entire contents of each of which are hereby incorporated by reference.

The invention relates to zeolite materials with nanometer dimensions and to a method for producing zeolite materials with nanometer dimensions.

Zeolites or zeolite-like materials ("zeo-types") are among the most important catalytic materials in petroleum processing and the petrochemical industry [Marcilly et al., Oil & Gas Science and Technology, 56 (2001) 499; Primo et al., Chem. Soc. Rev. (2014) DOI: 10.1039/C3CS60394F]. The widespread use of zeolites as catalysts in the production of a wide variety of products is substantially attributable to their adjustable acidity and perfectly structured micropores [Martinez et al., Coordination Chemistry Reviews, 255 (2011) 1580]. The presence of micropores with diameters of the order of magnitude of molecules leads to outstanding shape selectivity in various methods catalyzed by zeolites [Martinez et al., Coordination Chemistry Reviews, 255 (2011) 1580]. However, these small pores also lead to several challenges. These include (i) slow transport of various chemical species to and from the active centers, (ii) acceleration of the catalyst deactivation by coking and (iii) limitation of the catalytic conversion by means of zeolites to small molecules [Chen et al., J. Mater. Chem., 22 (2012) 17381; Li et al., Chem. Cat. Chem., 6 (2014) 46].

In recent years, in the research into zeolite materials, great efforts have been made to develop nanozeolites (in particular zeolites or zeolite-like materials with particle sizes of less than 300 nm). Because of the small dimensions, nanozeolites can shorten the transport paths for molecules in crystals, and therefore significantly accelerate the transport processes. In this way, both the performance and the durability of zeolites in various reactions are improved. Furthermore, nanozeolites have an enlarged external surface area, which increases the number of surface atoms and therefore allows the conversion of larger molecules [Mintova et. al., Nanoscale, 5 (2013) 6693].

In recent years, a plurality of methods for the production of nanozeolites have been reported in the literature [Mintova et. al., Nanoscale, 5 (2013) 6693; Valtchev et. al., Chem. Rev., 113 (2013) 6734]. Most of these methods are based on influencing the crystallization process so that the seed formation rate is maximized and the seed growth rate is slowed [Cundy et. al., Microporous and mesoporous materials, 82 (2005) 1; Di Renzo, Catal. Today, 41 (1998) 37]. This is usually achieved by increasing the alkalinity, reducing the synthesis temperature or by ageing the synthesis gel. The alkalinity is maximized by higher sodium hydroxide contents or basic template molecules such as TPAOH [Mintova et. al., Nanoscale, 5 (2013) 6693; Van Grieken et. al., Microporous and mesoporous materials, 39 (2000) 135]. Accordingly, the established methods for the production of nanozeolites are divided into template-free and template-based methods. In template-free methods, no organic molecules are required throughout the entire process. They therefore represent the cheapest and most ecological variants of all methods for obtaining nanozeolites. These methods, however, are only suitable for the production of nanozeolites with a relatively high aluminum content. For catalysis, on the other hand, nanozeolites with a lower proportion of aluminum are of great importance. For the production of aluminum-free or low-aluminum nanozeolites, the use of organic molecules (templates) is indispensable, and in this case template-based methods have gained great importance. The organic compounds used in such methods generally fulfill three functions: (i) source of the alkalinity, (ii) template and (iii) stabilizers in order to minimize the agglomeration of nanoparticles. For this, however, large amounts of template are required. Because of the high template consumption in conventional synthesis methods, these methods are very expensive and not ecological, which makes use in industrial production difficult. Furthermore, the separation of nanozeolites from the synthesis mixture is very difficult, the maximum attainable yield of nanozeolites is very low (less than 60% by weight) and removal of the template after synthesis of the nanozeolites is very difficult.

Against this background, it was an object of the present invention to provide a zeolite material and/or zeolite-like material with nanometer dimensions, in the generation and use of which the aforementioned obstacles are overcome.

It was a further object of the invention to provide a method which makes it possible to provide a zeolite material and/or zeolite-like material with nanometer dimensions in an efficient and economical way.

In order to achieve this object, according to a first aspect the present invention provides a particulate material which comprises zeolitic particles having a crystalline structure, which contain as the main component a zeolite material having a zeolitic framework structure formed from Si, O and optionally Al, and/or a zeolite-like material having a zeolitic framework structure which is formed not only from Si, O and optionally Al, characterized in that the zeolitic particles are in the form of essentially spherical particles with nanometer dimensions.

The particulate material according to the invention can be produced with the aid of a very simple method. The nanodimensions of the material of the present invention can shorten the transport path lengths of molecules and therefore offer outstanding diffusion properties and strong resistance against the formation of coke in various catalytic reactions. The nanozeolites according to the invention are therefore suitable for example as catalysts in petroleum processing, for the conversion of hydrocarbons, for example in redox reactions, rearrangements and condensation reactions. In addition, the materials of the present invention may be employed in separation technology, in the production of core-shell materials by encapsulation of metals (for example catalysts), in the production of membranes and composite materials, and as carriers for the immobilization of various macromolecules (for example enzymes, colorants).

According to a second aspect, furthermore, a process is provided for the production of a particulate material which comprises zeolitic particles having a crystalline structure, which contain as the main component a zeolite material having a zeolitic framework structure formed from Si, O and optionally Al, and/or a zeolite-like material having a zeolitic framework structure which is formed not only from Si, O and optionally Al, wherein the zeolitic particles are in the form of particles with nanometer dimensions.

The process according to the invention comprises the following steps:

a) providing a starting material comprising porous starting particles of at least one oxide that can form a zeolite material having a zeolitic framework structure or a zeolite-like material having a zeolitic framework structure;

b) introducing a solution or dispersion of an organic compound which can act as a template for the synthesis of a zeolitic framework structure, into the pores of the porous starting particles,
and subsequently fully or partially removing the solvent of the solution or dispersion, so that the organic compound remains in the pores of the porous starting particles;

c) converting the starting material obtained in step b), which contains the porous starting particles with the organic compound in the pores, by heating the starting material in contact with steam so that the zeolitic particles having a crystalline structure are formed, which contain as the main component a zeolite material having a zeolitic framework structure formed from Si, O and optionally Al, and/or a zeolite-like material having a zeolitic framework structure which is formed not only from Si, O and optionally Al, wherein the zeolite particles are in the form of particles with nanometer dimensions, preferably in the form of essentially spherical particles with nanometer dimensions.

The process according to the invention is simple, ecological and can be carried out rapidly. It works without large template quantities and high alkalinity, and less washing solution and fewer washing steps are required in order to obtain the nanoparticles.

The particulate material according to the invention, or produced according to the invention, respectively, comprises zeolitic particles having a crystalline structure, which contain as the main component a zeolite material having a zeolitic framework structure formed from Si, O and optionally Al, and/or a zeolite-like material having a zeolitic framework structure which is formed not only from Si, O and optionally Al. Such particles will also be referred to briefly here as "zeolitic particles" for simplification. Besides the zeolitic particles, the particulate material according to the invention may also comprise other components, although it may consist exclusively of the zeolitic particles. Typically, zeolitic particles form the main component of the particulate material and preferably constitute 70 wt % or more, more preferably 90 wt % or more, in particular 100 wt %, expressed in terms of the total weight of the particulate material.

The crystalline structure of the zeolitic particles is provided, in particular, by the zeolitic framework structure. The zeolitic particles with a crystalline structure may, for example, be particles in which the zeolitic framework structure forms a uniform crystalline phase in the sense of a single crystal, or particles in which the zeolitic framework structure forms a polycrystalline phase.

The zeolitic particles contain as the main component a zeolite material and/or a zeolite-like material, i.e. either the zeolite material or the zeolite-like material, or both together, form the main component of the zeolitic particles. Preferably, the main component is a zeolite material. According to the understanding of the person skilled in the art, the main component relates to the component which constitutes the greatest part of the total weight of the zeolitic particles. Preferably, the zeolitic particles contain the zeolite material, the zeolite-like material, or the sum of the two, in a proportion of 60 wt % or more, more preferably 70 wt % or more, expressed in terms of the total weight of the zeolitic particles. As is apparent for the person skilled in the art and will be discussed below, further components of the zeolitic particles may for example be guest molecules or guest atoms, which are contained in the zeolitic framework structure.

The zeolite material and the zeolite-like material of the zeolitic particles have a zeolitic framework structure. Such framework structures are known to the person skilled in the art. They comprise channels and/or cages which are, for example, suitable for the incorporation of guest molecules. Zeolite material in this case typically refers to a material having a zeolitic framework structure which is formed from Si, O and optionally Al. Silicon atoms (Si), oxygen atoms (O) and optionally aluminum atoms (Al) are typically the only elements from which the zeolitic framework structure in the zeolite material is formed. In the zeolitic framework structure of a zeolite material, silicon oxide tetrahedra and optionally aluminum oxide tetrahedra are connected via common oxygen atoms. While the composition of the individual tetrahedra can be represented by $SiO_4$ or $AlO_4$, the stoichiometry of the oxide components in the zeolite material is generally given by the formula $SiO_2$ or $SiO_{4/2}$, and $AlO_2$ or $AlO_{4/2}$ respectively, because of the oxygen atoms shared by a plurality of tetrahedra.

A zeolite-like material refers to a material which likewise has a zeolitic framework structure, but is formed not only from Si, O and optionally Al. Rather, other elements may be involved in the formation of the framework structure besides Si, O and optionally Al. These are typically elements which are capable of forming an oxide network and can be in tetrahedral coordination (also referred to here as "network-forming elements"). Typical network-forming elements, which besides Si and optionally Al are also suitable for providing a zeolitic framework material, are other elements of the $3^{rd}$, $4^{th}$ and $5^{th}$ main groups of the periodic table (groups 13, 14 and 15 according to current IUPAC classification). Examples are one or more elements selected from P, B, Ti and Ga. Preferably, the zeolitic framework structure of a zeolite-like material is formed from Si, O and optionally Al, and one or more elements selected from P, B, Ti and Ga.

In connection with the particulate material and the production method of the present invention, zeolite materials and zeolite-like materials are also referred to by the common term "zeolitic materials".

As is familiar to the person skilled in the art, the framework structure of zeolitic materials is formed by tetrahedral base units, which are connected via common oxygen atoms. In these tetrahedral base units, one atom T is surrounded by four oxygen atoms, so that the base units may also be described by the formula $TO_2$, or $TO_{4/2}$. In this case, T denotes an element which is capable of forming an oxide network and can be in tetrahedral coordination (also referred to here as "network-forming element"). Typical network-forming elements, the oxides of which are suitable for forming zeolite structures, are elements of the $3^{rd}$, $4^{th}$ and $5^{th}$ main groups of the periodic table (groups 13, 14 and 15 according to current IUPAC classification). Examples are one or more elements selected from Si, Al, P, B, Ti and Ga. If trivalent atoms T occur in the framework structure in the form of connected tetrahedra $TO_2$, for example Al, B or Ti, they carry a negative formal charge. This charge is generally balanced by the presence of cations, in which case cations of one type or cations of different types may be used.

Preferably, the zeolitic framework structure in the zeolitic material of the particles is formed by tetrahedral $SiO_2$ units, and silicon atoms in the framework structure may be replaced by one or more other network-forming elements selected from elements of main groups 3, 4 and 5 of the periodic table. Preferably, the other network-forming elements are one or more elements selected from boron, aluminum, phosphorus and titanium. More preferably, the zeolitic framework structure is formed by tetrahedral $SiO_2$ units, and silicon atoms in the framework structure may be replaced by aluminum, or it is formed exclusively by $SiO_2$ units. Typically, not more than 30%, preferably not more than 20%, and more preferably not more than 10%, of all the silicon atoms in the zeolite framework structure are replaced by other elements. In this case, the percentage relates to the number of all network-forming atoms, and therefore all tetrahedrally coordinated positions in the zeolitic framework structure, as 100%. Cations for charge balancing of formal charges possibly present in the framework structure are preferably selected from alkali metal cations, alkaline-earth metal cations or ammonium cations. One characteristic feature of zeolites, or a zeolitic material, is the mobility or exchangeability of the cations.

As mentioned above, the zeolitic framework structure in the zeolitic material of the particles is preferably formed by connected $SiO_2$ tetrahedra (also referred to as $SiO_{4/2}$) or by connected $SiO_2$ and $AlO_2$ (also referred to as $SiO_{4/2}$ and $AlO_{4/2}$) tetrahedra. Although a certain number of the Si atoms may be replaced by other tetravalent atoms, and/or a certain number of the Al atoms may be replaced by other trivalent atoms, it is more preferred for the framework structure to consist only of the $SiO_2$ and $AlO_2$ tetrahedra, or only of the $SiO_2$ tetrahedra. The structure of a zeolite material having such a zeolite framework may be represented by the formula $M_{x/n}[(AlO_2)_x(SiO_2)_y]$ or $M_{x/n}[(AlO_2)_x(SiO_2)_y] \cdot z\, H_2O$. Here, M represents one or more types of cations with the valency or charge n (for example alkali metal cations and/or alkaline-earth metal cations, so that n is typically 1 or 2, and in the presence of alkali metal cations and alkaline-earth metal cations may also take values between 1 and 2), and $z\, H_2O$ represents water molecules which may be adsorbed in the pores of the zeolite framework. The variables x and y stand for the proportion of neutral $SiO_2$ tetrahedra and negatively charged $AlO_2$ tetrahedra. Preferably, the zeolitic material of the particles of the present invention is a high-silica zeolitic material. The molar ratio Si/Al (and in particular the ratio y/x in the formula above) in such a high-silica material is preferably at least 3.5, more preferably at least 10, and in particular at least 15. x may also be 0.

In general, the high-silica zeolitic materials preferred here are characterized in that the molar ratio of the tetrahedrally coordinated Si atoms to the sum of the other tetrahedrally coordinated network-forming atoms optionally present, such as boron, aluminum, phosphorus or titanium, in the zeolite framework structure is preferably at least 3.5, more preferably at least 10, and in particular at least 15.

As is familiar to the person skilled in the art, depending on the selection of the framework constituents and the synthesis conditions, zeolites form characteristic framework structures for which particular type designations are established. Examples of zeolite materials which are preferably contained in the zeolitic particles are, as mentioned above, in particular so-called high-silica zeolites. Preferred zeolite types, which belong to this class of zeolites and which form a preferred framework structure in the zeolitic particles within the scope of the invention, are in particular those of the MFI, BEA, MOR, FER, MWW, MTW, DDR, CHA, AEI or MEL structure type. Zeolites of the MFI and BEA type are particularly preferred.

The zeolitic particles of the particulate material according to the invention may respectively contain more than one zeolite material and/or zeolite-like material, for example 2 different zeolite materials, two different zeolite-like materials, or a zeolite material and a zeolite-like material may be combined in a zeolite particle. Furthermore, the material according to the invention may also contain different zeolitic particles, which respectively contain a single zeolite material and/or zeolite-like material, but differ from one another in terms of the zeolite material and/or zeolite-like material contained.

The zeolitic material of the present invention typically has a microporous framework structure. As is characteristic of zeolitic structures, the micropores of the framework structure form a pore system of micropores connected to one another.

Unless otherwise explained in an individual case, the reference to micropores is made on the basis of the IUPAC convention, wherein pores with a pore diameter $d_P$ of up to <2 nm are referred to as micropores, pores with a diameter $d_P$ of from 2 to 50 nm are referred to as mesopores, and pores with a diameter of more than 50 nm are referred to as macropores [Haber et al., IUPAC, Pure and Appl. Chem., 63 (1991) 1227]. For example for micropores and mesopores, the pore diameter may be determined with the aid of sorption methods by means of gases. For analysis of the pore diameter and of the pore size distribution of micropores and mesopores, as specified here, such a gas adsorption method was used.

As described above, the pore structure and the pore size of the micropores are substantially predetermined by the zeolite type, or the composition of the zeolitic material which forms the zeolitic framework structure. As is familiar to the person skilled in the art, these are in turn influenced by the chemical composition of the oxides used for production, the production conditions and optionally the use of an organic compound as a template. The particle size and geometry of the particles may be adjusted according to the invention by the production method described in detail below, and for example by the geometry and in particular the size of the oxide particles used in this context.

As particles with nanometer dimensions, particles are referred to herein whose particle size is less than 1 μm.

The zeolitic particles in the particulate material according to the invention are in the form of essentially spherical particles with nanometer dimensions, i.e. the particulate material according to the invention essentially or exclusively contains zeolitic particles which have an essentially spherical shape, and it contains essentially or exclusively zeolitic particles whose particle size is less than 1 μm. Preferably, at least 90% of all the zeolitic particles present in the particulate material according to the invention, expressed in terms of the total number of zeolitic particles, more preferably at least 95%, and most preferably all the zeolitic particles present satisfy these two requirements.

The particle size and the particle size distribution may, in the context of the invention, for example be determined from electron microscopy images, such as SEM images, of the particulate material, or by laser light scattering, such as dynamic light scattering (DLS). Indications of the particle size distribution are preferably made on the basis of a size determination by laser light scattering, in particular DLS. For example, to this end the particles may be dispersed in water or aqueous systems for this purpose.

The person skilled in the art can, for example, verify the essentially spherical shape on electron microscopy images, such as SEM images, of the particulate material. "Essentially spherical" in this case refers, in particular, to particles in which the ratio of the longest diameter to the shortest diameter is less than 1.5, preferably less than 1.2, and more preferably less than 1.1. As a most preferred embodiment, the zeolitic particles in the particulate material according to the invention are spherical particles.

In the particulate material according to the invention, preferably at least 90% of all the zeolitic particles, expressed in terms of the particle number, have a particle size of 500 nm or less, more preferably 200 nm or less, and even more preferably 150 nm or less.

Furthermore, in the particulate material according to the invention preferably at least 90% of all the zeolitic particles, expressed in terms of the particle number, have a particle size of 20 nm or more, more preferably 50 nm or more, and most preferably 70 nm or more.

In the particulate material according to the invention, preferably at least 90% of all the zeolitic particles present in the material, based on the total number of zeolitic particles, more preferably at least 95%, and most preferably all the zeolitic particles present have these preferred or more preferred particle sizes.

A particulate material in which at least 90% of all the zeolitic particles, expressed in terms of the particle number, have a particle size of from 20 to 500 nm, more preferably from 50 to 200 nm, and even more preferably from 70 to 150 nm, is therefore preferred.

It is furthermore preferred for the particle size distribution of the zeolitic particles to have a single peak.

With the aid of the process according to the invention as described below, it is in particular possible to provide zeolitic particles which have a very low degree of aggregation, or even no aggregation, of the primary zeolitic particles. Preferably, therefore, less than 20% of the zeolitic particles in the particulate material according to the invention, more preferably less than 10% of the zeolite particles, are grown together to form aggregates. The percentages in this case refer to the number of corresponding particles, based on the total number of zeolitic particles. According to one particularly preferred embodiment, a particulate material may be provided which is free of zeolitic particles that are grown together to form aggregates. The relative number of the particles that have grown to form aggregates may, for example, be determined with the aid of electron microscopy images, such as SEM images, of the zeolitic particles.

Besides the zeolitic framework structure, the zeolitic particles may also comprise further components. For example, one or more metal-containing components that are not involved in the structure of the zeolitic framework material may be contained in the zeolitic particles. Such metal-containing components have, in particular, no covalent bonds with the zeolitic framework material.

Typically, such a metal-containing component may be embedded in the zeolitic framework structure. As is known of zeolitic structures, the metal-containing component may in this case be present as a guest atom or guest molecule in the zeolitic framework material, for example. The embedding of the metal-containing component may be reversible, i.e. without destruction of the zeolite framework structure it may be removed again therefrom or replaced by another metal-containing component, or it may be irreversible.

If the zeolitic particles are polycrystalline particles, a metal-containing component may also be incorporated into such polycrystalline particles in the inter-crystalline region.

Examples which may be mentioned for metal-containing components are metal atoms, metal salts, metal cations or metal complexes. Examples of metals which may form the metal-containing component or may be contained in it are Fe, Co, Cu, Ni, Ce, or noble metals such as Rh, Pt, Pd, Au, or Ag. Combinations of two or more metal-containing components may also be used.

The particulate material according to the invention may be used in different forms. It may, for example, be present and also used in the form of an unordered, typically loose powder of individual particles, or of secondary particles formed therefrom. Such secondary particles are typically agglomerates of particles, in which the particles have not grown together but merely adhere to one another by physical interactions. The zeolitic particles may, however, also be in the form of shaped bodies, for example as extruded, pelletized or tableted shaped bodies. Optionally, suitable binders may be used in order to ensure stability of the shape. A further possibility is to apply the zeolitic particles in the form of a layer, typically a thin layer having a layer thickness of at least 0.1 µm, onto a suitable carrier, or to shape them, for example with the aid of a binder, to form a self-supporting membrane.

The particulate material according to the invention is suitable for a multiplicity of applications, for example those which are described in the introduction for zeolites and zeolite-like materials. Typical fields of use are use as catalysts in heterogeneously catalyzed processes, particularly in the refining of petroleum or petroleum constituents. Mention may be made here by way of example of cracking, hydrocracking or reforming. The particulate material may furthermore also be used in general for the conversion of hydrocarbons, for example in redox reactions, rearrangements or condensation reactions. Furthermore, the materials according to the invention may also be used as catalysts in the chemical conversion and use of biomasses or in the controlled breakdown of macromolecular carbon-based materials. Further possibilities of use exist, for example, in sorption processes, which may for example be carried out in the context of purification or separation methods. Furthermore, the materials according to the invention are suitable for the production of membranes or composite materials, or as carriers for the immobilization of various macromolecules, for example enzymes or colorants, as well as for sensors or constituents of sensors.

As explained above, according to a second aspect a process is provided for producing a particulate material which comprises zeolitic particles having a crystalline structure, which contain as the main component a zeolitic material having a zeolitic framework structure formed from Si, O and optionally Al, and/or a zeolite-like material having a zeolitic framework structure which is formed not only from Si, O and optionally Al, wherein the zeolitic particles are in the form of particles with nanometer dimensions, and wherein the process comprises the following steps:

a) providing a starting material comprising porous (preferably mesoporous) starting particles of at least one oxide that can form a zeolite material having a zeolitic framework structure or a zeolite-like material having a zeolitic framework structure;

b) introducing a solution or dispersion of an organic compound which can act as a template for the synthesis of a zeolitic framework structure, into the pores of the porous starting particles,
and subsequently fully or partially removing the solvent of the solution or dispersion, so that the organic compound remains in the pores of the porous starting particles;

c) converting the starting material obtained in step b), which contains the porous starting particles with the organic compound in the pores, by heating the starting material in contact with steam so that the zeolitic particles are formed.

Preferably, the particulate material produced with the aid of the process according to the invention is the particulate material described in detail above according to the first aspect of the present invention, in which the zeolitic particles are in the form of essentially spherical particles with nanometer dimensions. All specifications which have been given above regarding the particulate material according to the invention, and the zeolitic particles contained therein, therefore apply in the same way for the particulate material, and the zeolitic particles contained therein, which can be provided according to preferred embodiments of the process according to the invention.

The porous starting particles in the starting material provided in step a) may be formed from one or more oxides. Suitable are oxides of elements in a which can form a zeolitic framework structure of a zeolite material or of a zeolite-like material. As described above, typical elements the oxides of which can form a zeolitic framework structure are elements which are capable of forming an oxide network and can be in tetrahedral coordination (also referred to here as "network-forming elements"). Preferred network-forming elements, the oxides of which are suitable for providing the porous starting particles for the method according to the invention, are elements of the $3^{rd}$, $4^{th}$ and $5^{th}$ main groups of the periodic table (groups 13, 14 and 15 according to current IUPAC classification). Examples are one or more elements selected from Si, Al, P, B, Ti and Ga. Accordingly, porous starting particles which are formed from one or more oxides of the elements mentioned above are preferably used in the scope of the process. More preferred are porous starting particles which are formed from silicon oxide, optionally in combination with an oxide of one or more elements selected from Al, P, B, Ti and Ga, or particles which are formed from silicon oxide and aluminum oxide, optionally in combination with an oxide of one or more elements selected from P, B, Ti and Ga. Particularly preferred are porous starting particles which are formed from silicon oxide, or from silicon oxide and aluminum oxide. The silicon oxide ($SiO_2$) content in the porous starting particles is preferably at least 70 wt %, based on the total weight of the particles. For porous starting particles which are formed from silicon oxide and aluminum oxide, the molar ratio of Si to Al is preferably at least 3.5, more preferably at least 10, and in particular at least 15.

The porous starting particles are usually amorphous.

The starting particles, or oxide particles, respectively, used in step a) are porous. They generally have pore diameters, for example determined by sorption measurements with gases, of from 1 to 50 nm. Preferably, they are mesoporous, i.e. with pore diameters of 2-50 nm. More preferably, the pore diameter is 2-30 nm, even more preferably 2-10 nm, and particularly preferably 3-6 nm. It is furthermore preferred that at least 80% of all the pores, expressed in terms of the pore number, particularly preferably at least 90% of all the pores, most preferably all the pores, show these diameters or preferred diameters. A defined arrangement of the pores is not necessary, and there is typically no superorder of the pores.

Accordingly, it is preferred for the starting particles to be amorphous mesoporous particles.

In the process according to the invention, porous starting particles with a uniform composition, or combinations of porous starting particles with more than one composition, may be used in the starting material of step a).

The porous starting particles preferably have a particle size of between 50 nm and 2000 nm, more preferably between 100 nm and 1000 nm, and in particular from 200 nm to 800 nm. The particle size may in this case be determined, for example, by means of electron microscopy images, such as SEM images, or by laser light scattering, such as dynamic light scattering (DLS). Indications of the particle size distribution are preferably made on the basis of a size determination by laser light scattering, in particular DLS. For example, to this end the particles may be dispersed in water or aqueous systems for this purpose.

Preferably, at least 90% of all the porous starting particles present in the starting material, expressed in terms of the total number of porous starting particles, more preferably at least 95%, and most preferably all the porous starting particles present, have these preferred or more preferred particle sizes.

Preferably, the porous starting particles of the starting material are essentially spherical particles. In the context of the invention, the essentially spherical shape may typically be verified from electron microscopy images, such as SEM images, of the zeolite particles. "Essentially spherical" in this case refers, in particular, to particles in which the ratio of the longest diameter to the shortest diameter is less than 1.5, preferably less than 1.2, and more preferably less than 1.1. As a most preferred embodiment, the porous starting particles are spherical particles.

Accordingly, it is more preferred for the starting particles to be essentially spherical amorphous mesoporous particles.

The pore volume of the pores with a diameter of from 1 to 50 nm in the porous starting particles of the starting material, which may for example be determined by gas adsorption methods, preferably lies in the range of from 0.2 to 2.0 ml/g, based on the weight of the porous starting particles.

The porous starting particles of the starting material are conveniently obtainable, for example, with the aid of the Stöber method, in which a silicon source, typically a silicic acid ester, for example tetraethyl orthosilicate (TEOS), is hydrolyzed and condensed in a mixture of water, ammonia, an alcohol such as ethanol, and a surfactant. Preferably used according to the invention are $SiO_2$ particles which may be obtained with the aid of the modified Stöber method, as is described for example in Gao et al. [Goo et al., J. Phys. Chem. C, 113 (2009) 12753] or [Ahmed et. al., Industrial & Engineering Chemistry Research, 49 (2010) 602] and in Example 2 and Example 3 below. Equally, compounds of other network-forming elements may also be used as an alternative or together with the silicon source, for example aluminates.

After provision of the starting material in step a), in step b) of the process according to the invention a solution or dispersion of an organic compound which can act as a template for the synthesis of a zeolitic framework structure, is introduced into the pores of the porous starting particles. Subsequently, the solvent of the solution or dispersion is fully or partially removed, so that the organic compound remains in the pores of the porous starting particles.

Suitable organic compounds, which are also referred to as organic templates or as structure-directing substances, are known to the person skilled in the art. They are generally alcohols, phosphorus compounds or amines, preferably tetraorganoammonium cations or tetraorganophosphonium cations, which are typically used in the form of their salts, for example as halides or hydroxides.

More preferably, they are tetraorganoammonium cations or tetraorganophosphonium cations which carry four hydrocarbon groups, in particular hydrocarbon groups which are selected independently of one another from alkyl groups, aryl groups and alkaryl groups. Preferably, the alkyl groups are C1-C4 alkyl groups. The phenyl group is preferred as an aryl group, and the benzyl group is preferred as an alkaryl group. Tetraalkylammonium cations are preferably used as tetraorganoammonium cations, such as the tetramethylammonium cation, for example in the form of tetramethylammonium hydroxide, the tetraethylammonium cation, for example in the form of tetraethylammonium hydroxide, the tetrapropylammonium cation, for example in the form of tetrapropylammonium hydroxide, the tetrabutylammonium cation, or the triethylmethylammonium cation. Further preferred examples for are the tetrabutylphosphonium cation, the triphenylbenzylphosphonium cation or the trimethylbenzylammonium cation. Besides this, for example, primary, secondary or cyclic amines (such as piperidine), imines (such as hexamethyleneimine) or alcohols may also be used as an organic template.

The following table gives a non-restrictive overview of conventional organic compounds as templates and the zeolite framework structures obtainable by the use thereof:

| Organic Molecules | Zeolites (Network Type) |
|---|---|
| TMA—(tetramethylammonium)$^+$ | X (FAU), sodalite (SOD), ZSM-10 (MOZ), ZSM-3 (EMT-FAU), ZSM-5 (MFI), ZSM-11 (MEL), ZSM-39 (MTN) |
| TEA—(tetraethylammonium)$^+$ | ZSM-5 (MFI), ZSM-11 (MEL), SAPO-34 (CHA), UZM-5 (UFI), ZSM-20 (EMT-FAU), ZSM-12 (MTW), beta (BEA) |
| TBP—(tetrabutylphosphonium)$^+$ | ZSM-5 (MFI), ZSM-11 (MEL) |
| TPA—(tetrapropylammonium)$^+$ | ZSM-5 (MFI), AlPO$_4$-5 (AFI), ZETA-1, ZETA-3 |
| TPBP—(triphenylbenzylphosphonium)$^+$ | ZSM-11 (MEL) |
| TMBA—(trimethylbenzylammonium)$^+$ | ZSM-11 (MEL) |
| TBA—(tetrabutylammonium)$^+$ | ZSM-5 (MFI), ZSM-11 (MEL) |
| TEMA—(triethylmethylammonium)$^+$ | ZSM-12 (MTW) |
| Primary and secondary amines | ZSM-5 (MFI), ZSM-22 (TON), ZSM-35 (FER) |
| Piperidine | Ferrierite (FER) |
| HMI—(hexamethyleneimine) | PSH-3 (MWW), ZSM-5 (MFI), SAPO-35 (LEV) |
| Alcohols | ZSM-5 (MFI) |

The organic compound is introduced into the pores of the porous starting particles in the form of a solution or a dispersion, for example in water as solvent. To this end, for example, the particles may be immersed or suspended in the solution or dispersion. Preferably, the organic compound is introduced into the pores of the porous starting particles in the form of a solution, for example in water as solvent.

Preferably, the introduction of the solution or dispersion in step b) is carried out in such a way that the solution or dispersion penetrates into all pores open to the particle surface, with a diameter of 1 nm or more, of the porous starting particles of the starting material. In order to achieve this, the solution or dispersion in step b) may for example be brought in contact with the porous starting particles for a sufficient period of time, and/or the viscosity of the solution or dispersion in step b) may be suitably adjusted, for example, by the concentration of the organic compound or the selection of the solvent.

The solvent is subsequently removed fully or partially, typically by means of vaporization or evaporation, preferably assisted by heating. Preferably, water is used as the solvent and is removed at temperatures below 100° C., preferably between room temperature and 70° C. Typically, more than 90 wt % of the solvent used, preferably more than 95 wt % of the solvent used, and more preferably more than 98 wt % of the solvent used, based on the total weight of the solvent in the solution or dispersion used, is removed.

The introduction of the solution or dispersion and the removal of the solvent are preferably carried out in such a way that, after carrying out step b), the organic compound is also present in pores at the center of the porous particles.

Preferably, quantity ratios of the organic compound to the oxide in the porous starting particles after removal of the solvent in step b), expressed as molar quantity of the organic compound which is present in the pores of the porous starting particles, to the molar quantity of the atoms of the element or elements in the form of oxide, such as Si and optionally Al, is preferably in the range of from 0.01 to 0.50, preferably 0.05 to 0.30, more preferably from 0.08 to 0.20, and particularly preferably from 0.10 to 0.16. The amount of organic compound which is present in the pores of the porous starting particles may, for example, be determined with the aid of thermogravimetry.

The fill factor of the pores with a diameter of 1 nm or more of the porous starting particles obtained after removal of the solvent in step b) with the organic compound, defined as the ratio of the volume of the organic compound contained in the pores and the pore volume of the pores with a diameter of 1 nm or more, is preferably from 50 to 100%. In this context as well, the pore volume may be determined with the aid of gas adsorption measurements. The volume of the organic compound contained in the pores may, for example, be determined by determining the weight of the organic compound contained in the pores by means of thermogravimetry, and calculation of the corresponding volume with the aid of the molar volume of the organic compound.

Besides the porous starting particles and the organic compound (the organic template), which are present in the pores of the porous starting particles, a precursor compound of one or more further oxides of network-forming elements, selected from one or more elements of main groups 3, 4 and 5 of the periodic table, may additionally be added to the starting material before the conversion in step c). Preferably, the precursor compound is selected from a precursor compound of an aluminum oxide, a titanium oxide, a phosphorus oxide or a boron oxide, or from combinations of such precursor compounds.

The precursor compounds are compounds familiar to the person skilled in the art, for example salts, including a hydroxide, alkoxides or metallates, which can be converted into oxides under the influence of heat and/or moisture. Particularly preferably, particularly in combination with porous SiO$_2$ starting particles, the precursor compound is an aluminum compound, a titanium compound, a phosphorus compound or a boron compound, or a combination of two or more thereof. Examples of aluminum compounds, which are suitable as precursor compounds, are aluminum salts such as aluminum nitrate, aluminates, for example alkali metal aluminates, aluminum alkoxides, for example aluminum triisopropylate, or aluminum hydrates, for example aluminum trihydrate. Examples of titanium compounds are titanium salts, titanates, titanium tetraethoxide, titanium ethoxy compounds such as titanium isopropoxide. Examples of phosphorus compounds are phosphates and phosphoric acid esters. Examples of boron compounds are boric acid, borates or boric acid esters, for example triethyl borate or trimethyl borate. The precursor compound may be added to the porous starting particles before, during or after the introduction of the organic compound (the organic template) into the pores. It is preferable to add it after the introduction of the organic template. The addition of the precursor compound is typically carried out in the form of a solution or a dispersion, preferably in water as solvent. After addition of the solution of the dispersion, the solvent may be removed fully or partially, for example by evaporation.

If such a precursor compound is used, the quantity ratio of the precursor compound to the oxide in the porous starting particles, expressed as a molar quantity of the atoms of the element/elements selected from one or more elements of main group 3, 4 and 5 of the periodic table, to the molar quantity of the atoms of the element in the form of an oxide in the porous starting particles typically lies in a range of at most 1, preferably less than 0.2, and particularly preferably less than 0.1.

In relation to the composition of the zeolitic framework structure of the zeolitic particles, which are formed with the aid of the method according to the invention, all specifications, including those regarding the preferred embodiments, which have been made above regarding the composition of the zeolitic framework structure of the zeolitic particles in the particulate material according to the invention, apply.

To this extent, it is the case, for example for the production method according to the invention, that the constituents of the starting material before the conversion in step c) are preferably selected in such a way that the zeolitic framework structure of the zeolitic particles formed during the conversion is formed from tetrahedral $SiO_2$ units, and up to 30%, preferably up to 20%, and more preferably up to 10%, of all the silicon atoms in the framework structure may be replaced by one or more other network-forming elements selected from elements of main groups 3, 4 and 5 of the Periodic Table. More preferably, the constituents of the starting material before the conversion in step c) are selected in such a way that the zeolitic framework structure of the zeolitic particles formed during the conversion is formed from tetrahedral $SiO_2$ units, and up to 30%, preferably up to 20%, and more preferably up to 10%, of all the silicon atoms in the framework structure may be replaced with one or more elements selected from boron, aluminum, phosphorus and titanium. Even more preferably, the constituents of the starting material before the conversion in step c) are selected in such a way that the zeolitic framework structure of the zeolitic particles formed during the conversion is formed from tetrahedral $SiO_2$ units, and up to 30%, preferably up to 20% and more preferably up to 10% of all the silicon atoms in the framework structure may be replaced with aluminum, or in such a way that the zeolitic framework structure of the zeolitic particles formed during the conversion is formed from tetrahedral $SiO_2$ units.

In general, it is preferred for the constituents of the starting material before the conversion in step c) to be selected in such a way that the zeolitic framework structure of the zeolitic particles formed during the conversion is a high-silica zeolite structure. Particularly preferably, the zeolitic framework structure is a zeolite structure selected from an MFI, BEA, MOR, FER, MWW, MTW, DDR, CHA, AEI or MEL zeolite structure, and more preferably an MFI or BEA zeolite structure.

Besides the constituents which contribute in particular to the formation of a zeolitic framework structure, i.e. the porous starting particles, the organic compound (the organic template) which is present in the pores of the porous starting particles, and optionally the precursor compound, a further metal compound may additionally be added to the starting material before the conversion in step c). With the aid of such a metal compound, for example, it is possible to form zeolitic particles which contain one or more metal-containing components that are not involved in the structure of the zeolitic framework material.

Preferred metal compounds contain a subgroup metal or a transition metal, for example Fe, Co, Cu, Ni, or Ce, or a noble metal, for example Rh, Pt, Pd, Au, or Ag.

Metal compounds may, for example, be introduced in the form of a salt of a corresponding metal cation, or in the form of a complex compound of a corresponding metal. They may, for example, be used in the form of solutions (for example aqueous or alcoholic) or suspensions.

According to one preferred procedure, for example, a metal compound may additionally be introduced into the pores of the porous starting particles of the starting material in addition to the organic compound (the organic template) in step b). For example, the metal compound may in this case additionally be contained in the solution or dispersion, which is introduced in step b), of the organic compound. As an alternative, for example, besides the solution or dispersion of the organic compound, a metal compound may be introduced by means of a further solution in parallel or sequentially into the pores of the porous starting particles of the starting material in step b).

Before the conversion in step c), the starting material may for example be in the form of a powder, but also in the form of a shaped body, for example obtainable by tableting, spray drying or extrusion, as a carried layer or as a self-supporting membrane.

In the subsequent step c), the starting material obtained in step b), which comprises the porous starting particles with the organic compound in the pores, is converted by heating the starting material in contact with steam, so that the zeolite particles are formed. As explained above, the specified sequence of steps does not exclude further steps being added after the introduction of the organic compound and the removal of the solvent in step b) and before the conversion in step c), such as the addition of additional components to the starting material. The conversion in step c) may, for example, be carried out by introducing the starting material into an autoclave, which contains water that at least partially enters the vapor phase during heating. In this case, the starting material to be converted should not come in contact with liquid water. Additional application of pressure is not necessary. As an alternative, the starting material may also be converted in step c) at atmospheric pressure in the presence of humid air, for example in a climate cabinet or an oven.

The temperature during the conversion in step c) typically lies between 50° C. and 250° C., but preferably between 60° C. and 160° C., and particularly preferably between 70° C. and 120° C. The duration of the conversion in step c) is typically between 1 h (hours) and 5 d (days), but preferably between 1 h and 2 d, and particularly preferably between 1 h and 1 d.

After the conversion has been carried out, the reaction mixture is generally allowed to cool. The product may then be used directly or still be subjected to conventional aftertreatment steps, such as washing. One of the advantages of the method according to the invention is, however, that the product obtained can be separated by very simple centrifugation after washing, and can be washed with a very small amount of water. In one particular embodiment of the method, the zeolitic particles formed can even be separated by a filtration process.

With the aid of the method according to the invention, a particulate material is provided that comprises zeolitic particles with a crystalline structure, the zeolite particles being in the form of particles with nanometer dimensions. In the present case, the term particles with nanometer dimensions refers to particles whose particle size is less than 1 µm. In the case of particles with directionally dependently different dimensions, this means that each dimension is less than 1 µm. Preferably, the zeolite particles are in the form of essentially spherical particles with nanometer dimensions.

The particulate material produced according to the invention contains essentially or exclusively zeolitic particles whose particle size is less than 1 µm. Preferably, at least 90% of all the zeolitic particles present in the particulate material produced according to the invention, expressed in terms of the total number of zeolite particles, more preferably at least 95%, and most preferably all the zeolite particles present, satisfy this requirement. The same applies for the preferred essentially spherical shape.

The particle size and the particle size distribution may also be determined for the particles produced according to the invention, for example, from electron microscopy images, such as SEM images, of the particulate material, or by laser light scattering, such as dynamic light scattering (DLS). Indications of the particle size distribution are preferably made on the basis of a size determination by laser light scattering, in particular DLS. For example, to this end the particles may be dispersed in water for this purpose.

The person skilled in the art may, for example, verify the essentially spherical shape on electron microscopy images, such as SEM images, of the particulate material. "Essentially spherical" in this case refers, in particular, to particles in which the ratio of the longest diameter to the shortest diameter is less than 1.5, preferably less than 1.2, and more preferably less than 1.1. As a most preferred embodiment, the zeolite particles in the particulate material produced according to the invention are spherical particles.

In the particulate material produced according to the invention, preferably at least 90% of all the zeolitic particles, expressed in terms of the particle number, have a particle size of 500 nm or less, more preferably 200 nm or less, and even more preferably 150 nm or less.

Furthermore, in the particulate material produced according to the invention preferably at least 90% of all the zeolitic particles, expressed in terms of the particle number, have a particle size of 20 nm or more, more preferably 50 nm or more, and most preferably 70 nm or more.

In the particulate material produced according to the invention, preferably at least 90% of all the zeolitic particles present in the material, expressed in terms of the total number of zeolitic particles, more preferably at least 95%, and most preferably all the zeolitic particles present have these preferred or more preferred particle sizes.

A particulate material in which at least 90% of all the zeolitic particles, expressed in terms of the particle number, have a particle size of from 20 to 500 nm, more preferably from 50 to 200 nm, and even more preferably from 70 to 150 nm, is therefore preferred.

It is furthermore preferred for the particle size distribution of the zeolitic particles produced according to the invention to have a single peak.

With the aid of the described method according to the invention, it is in particular possible to provide zeolitic particles which have a very low degree of aggregation, or even no aggregation, of the primary zeolitic particles. Preferably, less than 20% of the zeolitic particles in the particulate material produced according to the invention, more preferably less than 10% of the zeolitic particles, are grown together to form aggregates. The percentages in this case refer to the number of corresponding particles, expressed in terms of the total number of zeolitic particles. According to one particularly preferred embodiment, a particulate material may be provided which is free of zeolitic particles that have grown together to form aggregates. The relative number of the particles that have grown to form aggregates may also be determined with the aid of electron microscopy images, such as SEM images, of the zeolitic particles.

Besides the zeolitic framework structure, the zeolitic particles produced according to the invention may also comprise further components. For example, one or more metal-containing components that are not involved in the structure of the zeolitic framework material may be contained in the zeolitic particles. Such metal-containing components have, in particular, no covalent bonds with the zeolitic framework material.

Typically, such a metal-containing component may be embedded by the zeolite framework structure. As is known of zeolite structures, the metal-containing component may in this case be present as a guest atom or guest molecule in the zeolite framework material, for example. The embedding of the metal-containing component may be reversible, i.e. without destruction of the zeolite framework structure it may be removed again therefrom or replaced with another metal-containing component, or it may be irreversible.

If the zeolite particles are polycrystalline particles, a metal-containing component may also be incorporated into such polycrystalline particles in the inter-crystalline region.

Examples which may be mentioned for metal-containing components are metal atoms, metal salts, metal cations or metal complexes. Examples of metals which may form the metal-containing component or may be contained in it are Fe, Co, Cu, Ni, Ce, or noble metals such as Rh, Pt, Pd, Au, or Ag. Combinations of two or more metal-containing components may also be used.

The properties of the material produced according to the invention may optionally be optimized with a view to special applications by conventional post-synthetic modifications known to the person skilled in the art, such as demetallization, impregnation, ion exchange or heat treatment.

Important aspects of the present invention are summarized in the following points:

1. A particulate material which comprises zeolitic particles having a crystalline structure, which contain as the main component a zeolite material having a zeolitic framework structure formed from Si, O and optionally Al, and/or a zeolite-like material having a zeolitic framework structure which is formed not only from Si, O and optionally Al, characterized in that the zeolite particles are in the form of essentially spherical particles with nanometer dimensions.

2. The particulate material according to point 1, characterized in that it comprises zeolitic particles which respectively contain one or more than one zeolite material or zeolite-like material.

3. The particulate material according to one of points 1 and 2, characterized in that it comprises zeolitic particles which contain one or more metal-containing components that are not involved in the structure of the zeolitic framework material.

4. The particulate material according to point 3, characterized in that the metal-containing components are embedded as guest atoms or guest molecules by the zeolitic framework structure of the zeolitic particles.

5. The particulate material according to one of points 1 to 4, characterized in that at least 90% of all the zeolitic particles, expressed in terms of the particle number, have a particle size of 500 nm or less, preferably 200 nm or less, and particularly preferably 150 nm or less.

6. The particulate material according to one of points 1 to 5, characterized in that at least 90% of all the zeolitic particles, expressed in terms of the particle number, have a particle size of 20 nm or more, preferably 50 nm or more, and particularly preferably 70 nm or more.

7. The particulate material according to one of points 1 to 6, characterized in that the zeolitic framework structure is formed from oxides of network-forming elements selected from one or more elements of main groups 3, 4 and 5 of the periodic table.

8. The particulate material according to one of points 1 to 7, characterized in that the zeolitic framework structure is formed from tetrahedral $SiO_2$ units, and up to 30%, preferably up to 20%, and more preferably up to 10%, of all the silicon atoms in the framework structure may be replaced by one or more other network-forming elements selected from elements of main groups 3, 4 and 5 of the periodic table.

9. The particulate material according to one of points 1 to 8, characterized in that the zeolitic framework structure is formed from tetrahedral $SiO_2$ units, and up to 30%, preferably up to 20%, and more preferably up to 10%, of all the silicon atoms in the framework structure may be replaced by one or more elements selected from boron, aluminum, phosphorus and titanium.

10. The particulate material according to one of points 1 to 8, characterized in that the zeolitic framework structure is formed from tetrahedral $SiO_2$ units, and up to 30%, preferably up to 20%, and more preferably up to 10%, of all the silicon atoms in the framework structure may be replaced by aluminum.

11. The particulate material according to one of points 1 to 8, characterized in that the zeolitic framework structure is formed from tetrahedral $SiO_2$ units.

12. The particulate material according to one of points 1 to 10, characterized in that the zeolitic framework structure is a high-silica zeolite structure.

13. The particulate material according to point 12, characterized in that the high-silica zeolite structure is an MFI, BEA, MOR, FER, MWW, MTW, DDR, CHA, AEI or MEL zeolite structure, preferably an MFI or BEA zeolite structure.

14. The particulate material according to one of points 1 to 13, characterized in that the material is in the form of an unordered powder, a shaped body, as a carried layer or as a self-supporting layer.

15. The particulate material according to one of points 1 to 14, characterized in that less than 10% of the zeolitic particles, expressed in terms of the particle number, have grown together to form aggregates.

16. The particulate material according to one of points 1 to 16, characterized in that it is free of zeolitic particles that have grown together to form aggregates.

17. The particulate material according to one of points 1 to 16, characterized in that the particle size distribution of the zeolitic particles has a single peak.

18. A process for producing a particulate material which comprises zeolitic particles having a crystalline structure, which contain as the main component a zeolite material having a zeolitic framework structure formed from Si, O and optionally Al, and/or a zeolite-like material having a zeolitic framework structure which is formed not only from Si, O and optionally Al, wherein the zeolitic particles are in the form of particles with nanometer dimensions, characterized in that the process comprises the following steps:

a) providing a starting material comprising porous starting particles, which are formed from at least one oxide that can form a zeolite material having a zeolitic framework structure or a zeolite-like material having a zeolitic framework structure;

b) introducing a solution or dispersion of an organic compound, which can act as a template for the synthesis of a zeolitic framework structure, into the pores of the porous starting particles, and subsequently fully or partially removing the solvent of the solution or dispersion, so that the organic compound remains in the pores of the porous starting particles;

c) converting the starting material obtained in step b), which contains the porous starting particles with the organic compound in the pores, by heating the starting material in contact with steam so that the zeolitic particles are formed.

19. The process according to point 18, wherein the porous starting particles are amorphous particles.

20. The process according to point 18 or 19, wherein the porous starting particles are particles with pore diameters of from 1 to 50 nm.

21. The process according to point 20, wherein the porous starting particles are mesoporous particles with pore diameters from 2 to 50 nm, preferably 2 to 30 nm.

22. The process according to one of points 18 to 21, wherein the porous starting particles are essentially spherical particles.

23. The process according to one of points 18 to 22, in particular point 22, wherein the particulate material produced by the method is the particulate material according to one of points 1 to 17.

24. The process according to one of points 18 to 23, characterized in that in the porous starting particles obtained in step b), a molar ratio of the organic compound in the pores to the oxide of from 0.01 to 0.50, preferably 0.05 to 0.30, more preferably from 0.08 to 0.20, and particularly preferably from 0.10 to 0.16, is adjusted.

25. The process according to one of points 18 to 24, wherein the pore volume of the pores with a pore diameter of 1 nm or more in the porous starting particles of the starting material lies in the range of from 0.2 to 2.0 ml/g, based on the weight of the porous starting particles.

26. The process according to one of points 18 to 25, wherein the introduction of the solution or dispersion in step b) is carried out such that the solution or dispersion penetrates into all pores that are open toward the particle surface, with a pore diameter of 1 nm or more, of the porous starting particles of the starting material.

27. The process according to point 26, wherein the solution or dispersion is brought in contact with the porous starting particles in step b) for a sufficient period of time for the solution or dispersion to penetrate into all pores that are open toward the particle surface, with a pore diameter of 1 nm or more, of the porous starting particles of the starting material.

28. The process according to point 26 or 27, wherein the viscosity of the solution or dispersion in step b) is adjusted in such a way that the solution or dispersion penetrates into all pores that are open toward the particle surface, with a pore diameter of 1 nm or more, of the porous starting particles of the starting material.

29. The process according to one of points 18 to 28, wherein the fill factor of the pores with a pore diameter of 1 nm or more of the porous starting particles obtained in step b) with the organic compound, defined as the ratio of the volume of the organic compound contained in the pores and the pore volume of the mesopores of the particles, is from 50 to 100%.

30. The process according to one of points 18 to 29, wherein a metal compound is additionally introduced into the pores of the porous starting particles of the starting material in step b).

31. The process according to point 30, wherein the metal compound is additionally contained in the solution or dispersion introduced in step b).

32. The process according to point 30, wherein, besides the solution or dispersion of the organic compound, a metal salt is introduced by means of a further solution in parallel or sequentially into the pores of the porous starting particles of the starting material in step b).

33. The process according to one of points 18 to 32, characterized in that the organic compound is also present in pores at the center of the porous particles after carrying out step b).

34. The process according to one of points 18 to 33, wherein the organic compound is a tetraorganoammonium cation or a tetraorganophosphonium cation.

35. The process according to one of points 18 to 34, characterized in that at least 90% of the porous starting particles, expressed in terms of the particle number, have a particle size of between 50 nm and 2000 nm, preferably between 100 nm and 1000 nm, and particularly preferably between 200 and 800 nm.

36. The process according to one of points 18 to 35, characterized in that the porous starting particles are formed from one or more oxides of network-forming elements selected from one or more elements of main groups 3, 4 and 5 of the periodic table.

37. The process according to one of points 18 to 36, characterized in that the porous starting particles comprise at least 70 wt % $SiO_2$, based on the total weight of the particles.

38. The process according to one of points 18 to 37, characterized in that one or more precursor compounds of one or more oxides of network-forming elements selected from elements of main groups 3, 4 and 5 of the periodic table are additionally added to the starting material before the conversion in step c).

39. The process according to point 38, characterized in that the precursor compound is selected from a precursor compound of an aluminum oxide, a titanium oxide, a phosphorus oxide and a boron oxide, or from combinations of such precursor compounds.

40. The process according to one of points 18 to 39, characterized in that the constituents of the starting material before the conversion in step c) are selected in such a way that the zeolitic framework structure of the zeolitic particles formed during the conversion is formed from tetrahedral $SiO_2$ units, and up to 30%, preferably up to 20%, and more preferably up to 10%, of all the silicon atoms in the framework structure may be replaced by one or more other network-forming elements selected from elements of main groups 3, 4 and 5 of the periodic table.

41. The process according to one of points 18 to 40, characterized in that the constituents of the starting material before the conversion in step c) are selected in such a way that the zeolitic framework structure of the zeolitic particles formed during the conversion is formed from tetrahedral $SiO_2$ units, and up to 30%, preferably up to 20%, and more preferably up to 10%, of all the silicon atoms in the framework structure may be replaced by one or more elements selected from boron, aluminum, phosphorus and titanium.

42. The process according to one of points 18 to 41, characterized in that the constituents of the starting material before the conversion in step c) are selected in such a way that the zeolitic framework structure of the zeolitic particles formed during the conversion is formed from tetrahedral $SiO_2$ units, and up to 30%, preferably up to 20%, and more preferably up to 10%, of all the silicon atoms in the framework structure may be replaced with aluminum.

43. The process according to one of points 18 to 42, characterized in that the constituents of the starting material before the conversion in step c) are selected in such a way that the zeolite framework structure of the zeolitic particles formed during the conversion is formed from tetrahedral $SiO_2$ units.

44. The process according to one of points 18 to 42, characterized in that the constituents of the starting material before the conversion in step c) are selected in such a way that the zeolite framework structure of the zeolite particles formed during the conversion is a high-silica zeolite structure.

45. The process according to point 44, characterized in that the high-silica zeolite structure is an MFI, BEA, MOR, FER, MWW, MTW, DDR, CHA, AEI or MEL zeolite structure, preferably an MFI or BEA zeolite structure.

46. The process according to one of points 18 to 45, characterized in that at least 90% of all the zeolitic particles, expressed in terms of the particle number, have a particle size of 500 nm or less, preferably 200 nm or less, and particularly preferably 150 nm or less.

47. The particulate material according to one of points 18 to 46, characterized in that at least 90% of all the zeolitic particles, expressed in terms of the particle number, have a particle size of 20 nm or more, preferably 50 nm or more, and particularly preferably 70 nm or more.

48. The process according to one of points 18 to 47, characterized in that the starting material before the conversion in step c) is in the form of an unordered powder, a shaped body or as a carried layer.

49. The process according to one of points 18 to 48, characterized in that the conversion in step c) is carried out in an autoclave which contains water.

50. The process according to one of points 18 to 49, characterized in that no contact of the starting material with liquid water takes place during the conversion in step c).

51. The process according to one of points 18 to 48, characterized in that the conversion in step c) takes place in contact with humid air under atmospheric conditions.

52. The process according to one of points 18 to 51, characterized in that the conversion in step c) takes place by heating the starting material to a temperature of from 50 to 250° C., preferably from 60 to 160° C., particularly preferably from 70 to 120° C.

53. The process according to one of points 18 to 52, characterized in that the duration of the conversion in step c) is between 1 h and 5 d, preferably between 1 h and 2 d, and particularly preferably between 1 h and 1 d.

54. The use of the particulate material according to one of points 1 to 17 as a catalyst in a heterogeneously catalyzed method.

55. The use according to point 54, wherein the method involves the refining of petroleum or petroleum constituents.

56. The use according to point 55, wherein the refining includes one or more method steps selected from cracking, hydrocracking, isomerization and reforming.

57. The use of the particulate material according to one of points 1 to 17 in a sorption process.

58. The use according to point 57, wherein the sorption process is carried out in the scope of a purification or separation method.

59. The use of the particulate material according to one of points 1 to 17 as a carrier for the immobilization of guest molecules.

60. The use of the particulate material according to one of points 1 to 17 as a sensor, or as a sensing component in sensors.

EXAMPLES

Example 1 (Comparative Example): Production of Nanozeolites According to an Established Method According to Van Grieken [R. Van Grieken et al. in Microporous and Mesoporous Materials, Vol. 39 (2000), 135-147]

37 g of distilled water and 94 g of tetrapropylammonium hydroxide solution (40 wt % TPAOH solution, Clariant) were stirred in a polypropylene bottle. 4.65 g of Al(NO$_3$)$_3$*H$_2$O (98 wt % from Sigma Aldrich) were added thereto, and the mixture was cooled to 0° C. with ice water. At 0° C., 105 g of tetraethyl orthosilicate (TEOS, 98 wt % from Alfa Aesar) were added, and stirring was continued for several hours. The colloidal solution obtained was then concentrated at 80° C. in order to remove water and ethanol. The concentrated colloidal solution, with a molar composition of SiO$_2$:0.011250 Al$_2$O$_3$:0.36 TPAOH:11H$_2$O, was transferred into a plurality of 50 ml autoclaves. All the autoclaves were then closed and heated to 170° C. The subsequent crystallization was carried out at 170° C. for 48 h in a preheated circulating air oven. The autoclave was then cooled to room temperature with cold water and opened, and the synthesis product was separated from the supernatant solution by centrifugation, and then washed several times with distilled water (pH 8). The drying was carried out at 75° C. overnight.

FIG. 3 shows by way of example an electron microscopy (SEM) image of the MFI crystals obtained. The nanoparticles obtained, with diameters of up to 50 nm, form agglomerates with diameters of up to 200 nm.

Example 2 (Production of Starting Particles): Production of Mesoporous SiO$_2$ Particles as Starting Products for Zeolitic Nanoparticles According to the Invention 828 g of distilled water were initially charged into a polypropylene cup, and 6 g of hexadecyltrimethylammonium bromide (CTAB, 98%, Sigma Aldrich) were added while stirring. 2876 g of technical ethanol (96%) were added to this mixture, and stirring was continued until a clear solution was obtained. 144 g of ammonia solution (25 wt %) with then added while stirring, and stirring was continued for 1 hour. 20 g of tetraethyl orthosilicate (TEOS, 98 wt %, Alfa Aesar) were then added, and the resulting mixture was stirred for a further 2 hours. The resulting SiO$_2$ particles were then separated from the synthesis mixture by centrifugation at 10,000 rpm and washed three times with distilled water. Lastly, the purified SiO$_2$ particles were dried in air at 75° C. overnight and then calcined at 550° C. in an air atmosphere.

The structure and the porosity of the SiO$_2$ particles produced in this way were confirmed by X-ray analysis (FIG. 4) and N$_2$ physisorption (FIG. 6), the particles having mesopores with a pore maximum in the distribution of about 3 nm. These particles furthermore had particle diameters of between 450 and 600 nm, as shown in the electron microscopy image in FIG. 5.

Example 3 (Production of Starting Particles): Production of Porous Al$_2$O$_3$—SiO$_2$ Particles as Starting Products for Zeolitic Nanoparticles According to the Invention Porous Al$_2$O$_3$—SiO$_2$ particles as starting products for the synthesis of zeolitic nanoparticles according to the invention were produced according to a modification of the method of Ahmed et. al. [Ahmed et. al., Industrial & Engineering Chemistry Research, 49 (2010) 602]. For a typical batch, 4 g of polyvinyl alcohol (PVA Mw of 31-50 k, 98 wt % from Sigma-Aldrich) were first dissolved in 105 g of deionized water at 80° C. in a beaker. After about 20 to 30 min, 0.12 g of sodium aluminate solution (53 wt % Al$_2$O$_3$ and 43 wt % Na$_2$O from Chemiewerk Bad Köstritz GmbH) were added to the PVA solution at 80° C. while stirring. The mixture thereby obtained continue to be stirred until the sodium aluminate had completely dissolved. The solution was then cooled to room temperature and transferred into a 500 ml stirred reactor made of glass. 1.61 g of CTAB and 101 g of ethanol were subsequently added to the cooled mixture while stirring and heated to 40° C. Finally, 7.2 g of TEOS were added, and the synthesis mixture obtained, with a molar composition of 1 TEOS:0.006 Al$_2$O$_3$:2.9 NH$_3$:0.12 CTAB:162H$_2$O:58 ethanol:0.003 PVA at 40° C., was stirred further for about 40 h. The SiO$_2$ particles obtained were separated from the synthesis mixture by centrifugation at 10,000 rpm and washed three times with deionized water. Finally, the purified Al$_2$O$_3$—SiO$_2$ particles were dried in air at 75° C. overnight and then calcined at 550° C. in an air atmosphere.

The structure and the porosity of the SiO$_2$ particles produced in this way were analyzed by X-ray analysis (FIG. 8) and N$_2$ physisorption, and it was confirmed that the particles have mesopores. Furthermore, these particles had particle diameters of between 550 and 700 nm as shown in the electron microscopy image in FIG. 7.

Example 4 (According to the Invention): Production of Aluminum-Free Zeolitic Nanoparticles 1 g of SiO$_2$ particles (Example 2) were mixed in a Teflon vessel with 1.25 g of tetrapropylammonium hydroxide solution (TPAOH, 40 wt %, Clariant), and 5 g of deionized water were added and stirring was continued for 16 h at room temperature. The suspension obtained was then dried at 65° C. in an oven for 6 h. In order to determine the degree of loading of TPAOH in the mesopores, the dried powder was analyzed by means of thermogravimetry (TGA). This revealed a proportion of the organic compound (the organic template) of about 25 wt %, which corresponds to about 83 vol % of the total mesopore volume of the SiO$_2$ particles. Furthermore, it could be demonstrated from the weight loss/temperature diagram (TGA profile) that the organic template (TPAOH) for the most part was located in the mesopores. Subsequently, the dried powder was finely ground in a mortar and transferred into 4 porcelain dishes, and these were then introduced into 23 ml Teflon vessels as represented in FIG. 2. In each Teflon container, there was 8 g of water. Care was taken that the water did not come in contact with the TPAOH-SiO$_2$ particles. Subsequently, all the Teflon vessels were transferred into 4 stainless steel autoclaves and closed in a pressure-tight fashion. Finally, the autoclave was heated for 12 h at 110° C. After the time had elapsed, all the autoclaves were cooled to room temperature. The solid contained therein was separated from the synthesis mixture by centrifugation at 10,000 rpm, washed three times with distilled water, dried overnight at 75° C. and subsequently characterized.

Electron microscopy images (FIG. 9a) showed that the solid product obtained consisted of very small crystals with nanometer dimensions, which have the spherical morphology of the mesoporous SiO$_2$ particles used as starting product (FIG. 5), and in contrast to the nanozeolites which were produced by the known synthesis method (Example 1) were not agglomerated. X-ray diffraction (FIG. 9a) shows that the product is a zeolite of the MFI type with high crystallinity. Furthermore, the yield of zeolite nanoparticles was determined at more than 80 wt %, expressed in terms of the weight of the porous starting particles used. FIG. 10 shows that all the mesopores in the mesoporous $SiO_2$ particles used as starting material had been converted into zeolite micropores.

FIG. 15 shows the particle size distribution of the starting particles produced in Example 2 ("MSP") and the nanoparticles obtained in Example 4 (with a conversion time in the autoclave of 6 and 12 h, respectively) measured by means of dynamic light scattering (DLS). In this case, the particles were suspended in water and subsequently dispersed by means of ultrasound treatment for about 2 h. Subsequently, the dispersion obtained was transferred into a cuvette and the particle size distribution was determined by means of DLS.

Example 5 (According to the Invention): Production of Aluminum-Containing Zeolitic Nanoparticles 1 g of $Al_2O_3$—$SiO_2$ particles (Example 3) were mixed in a Teflon vessel with 1.25 g of tetrapropylammonium hydroxide solution (TPAOH, 40 wt %, Clariant), and 5 g of deionized water were added and stirring was continued for 16 h at room temperature. The suspension obtained was then dried at 65° C. in an oven for 6 h. Subsequently, the dried powder was finely ground in a mortar and transferred into porcelain dishes, and these were then introduced into 23 ml Teflon vessels as represented in FIG. 2. In each Teflon container, there was 8 g of water. Care was taken that the water did not come in contact with the TPAOH-$Al_2O_3$—$SiO_2$ particles. Subsequently, the Teflon vessels were transferred into stainless steel autoclaves and closed in a pressure-tight fashion. Finally, the autoclave was heated for 12 h at 110° C. After the time had elapsed, all the autoclaves were cooled to room temperature. The solid contained therein was separated from the synthesis mixture by centrifugation at 10,000 rpm, washed three times with distilled water, dried overnight at 75° C. and subsequently characterized.

Electron microscopy images (FIG. 12b) showed that the solid product obtained consisted of very small crystals with nanometer dimensions, which have the spherical morphology of the mesoporous $Al_2O_3$—$SiO_2$ particles used as starting product (FIG. 12b), and in contrast to the nanozeolites which were produced by the known synthesis method (Example 1) were not agglomerated. X-ray diffraction (FIG. 11) shows that the product is a zeolite of the MFI type with high crystallinity. Furthermore, the yield of zeolite nanocrystals was determined at more than 80 wt %. Furthermore, an Si/Al ratio of 100 was measured by ICP-OES.

Example 6 (According to the Invention): Production of Platinum-Containing Zeolitic Nanoparticles (Pt/ZSM-5)

Pt/ZSM-5 was produced from $Al_2O_3$—$SiO_2$ particles (Example 3) by a 2-step ion exchange process and impregnation. In the $1^{st}$ of the ion exchange steps, 4 g of $Al_2O_3$—$SiO_2$ particles were stirred with 100 g of 0.2 M NaCl at 60° C. for 3 h. This procedure was repeated two times. The $Na^+$—$Al_2O_3$—$SiO_2$ particles were then washed three times with deionized water and dried overnight at 75° C. In the $2^{nd}$ of the ion exchange steps, Na was replaced with $[Pt(NH_3)_4]^{2+}$. To this end, 1.75 g of $Na^+$—$Al_2O_3$—$SiO_2$ particles were stirred with 43 g of 1 mM $[Pt(NH_3)_4](NO_3)_2$ at 60° C. overnight. The Pt-containing $Al_2O_3$—$SiO_2$ particles were then separated by centrifugation, washed several times (six times) with deionized water and dried at 75° C. overnight. 1 g of $[Pt(NH_3)_4]^{2+}$—$Al_2O_3$—$SiO_2$ particles was subsequently mixed in a Teflon vessel with 1.25 g of tetrapropylammonium hydroxide solution (TPAOH, 40 wt %, Clariant), and 5 g of deionized water were added and stirring was continued for 16 h at room temperature. The suspension obtained was dried at 65° C. in an oven for 6 h. Subsequently, the dried powder was finely ground in a mortar and transferred into 4 porcelain dishes and then into 4 different 23 ml Teflon vessels as represented in FIG. 2. In each Teflon container, there was 8 g of water. Care was taken that the water did not come in contact with the TPAOH-$SiO_2$ particles. Subsequently, the Teflon vessels were transferred into stainless steel autoclaves and closed in a pressure-tight fashion. Finally, the autoclave was heated for 24 h at 110° C. After the time had elapsed, all the autoclaves were cooled to room temperature. The solid contained therein was separated from the synthesis mixture by centrifugation at 10,000 rpm, washed three times with distilled water, dried overnight at 75° C. and subsequently characterized.

Electron microscopy images (FIGS. 14a and b) showed that the solid product obtained consisted of very small crystals with nanometer dimensions, which have the spherical morphology of the mesoporous $Al_2O_3$—$SiO_2$ particles used as starting product, and in contrast to the nanozeolites which were produced by the established synthesis method (Example 1) were not aggregated. X-ray diffraction (FIG. 13) shows that the product is a zeolite of the MFI type with high crystallinity. Furthermore, the yield of zeolite nanoparticles was determined at more than 80 wt %. Furthermore, an Si/Al ratio of 100 and a platinum content of 0.59 wt % were measured by ICP-OES. By STEM, it was possible to show that the Pt nanoparticles (1-2.5 nm size) were embedded in the zeolite framework structure of the zeolite nanoparticles.

Figure 1:
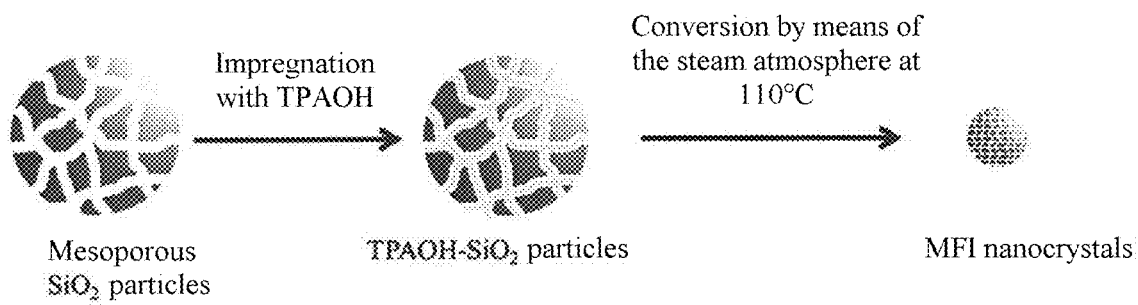
FIG. 1 shows by way of example a schematic representation of the main steps in the production of zeolitic nanoparticles of the MFI type.
Figure 2:
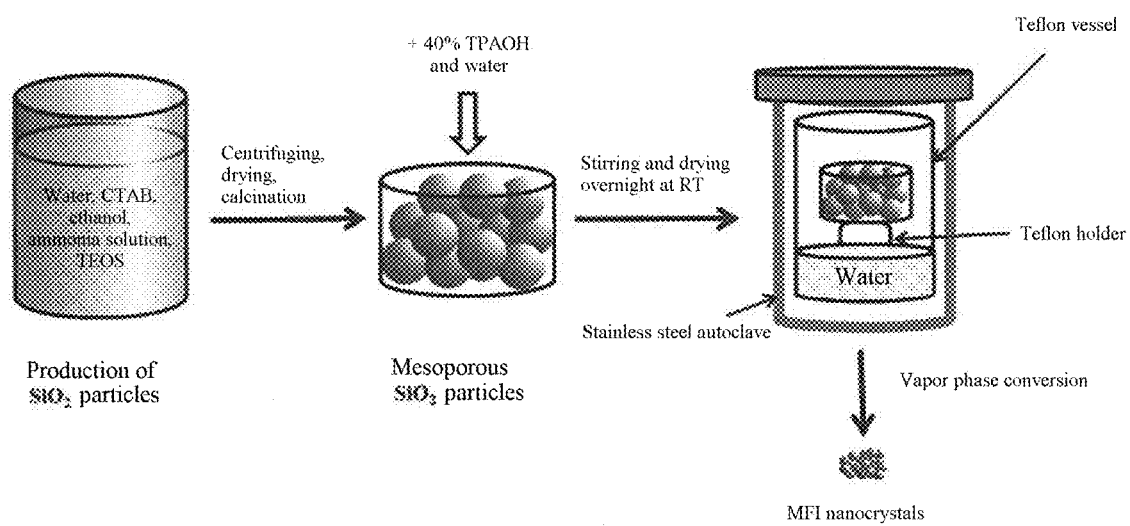
FIG. 2 shows by way of example a schematic representation of the various steps and the experimental setup in the production of zeolitic nanoparticles of the MFI type.
Figure 3:
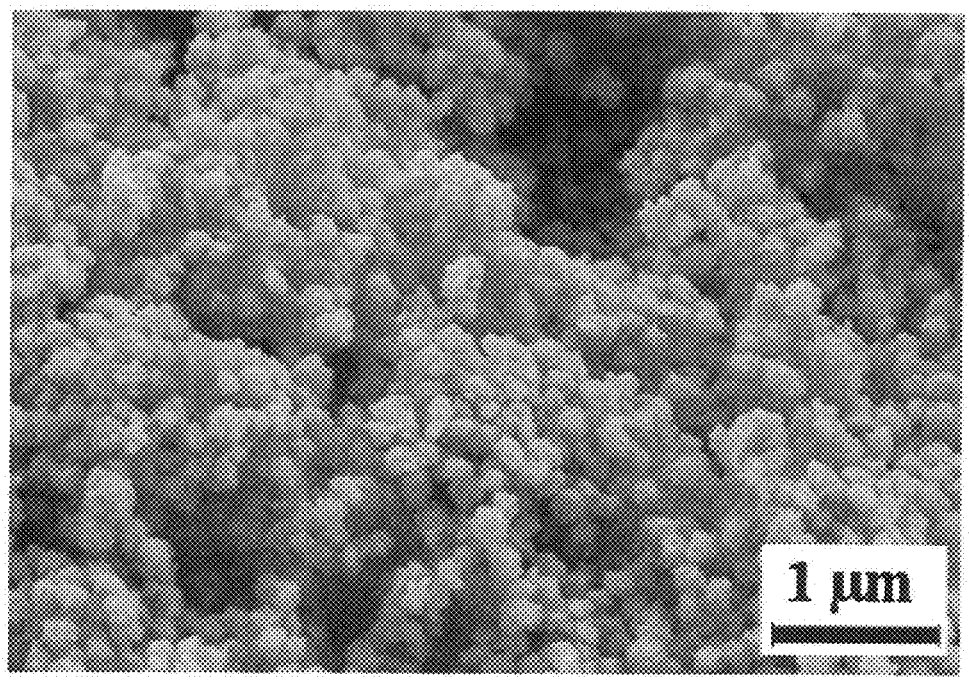
FIG. 3 shows a scanning electron microscope (SEM) image of the nanozeolites of the MFI type produced according to Example 1 (comparative example).
Figure 4:
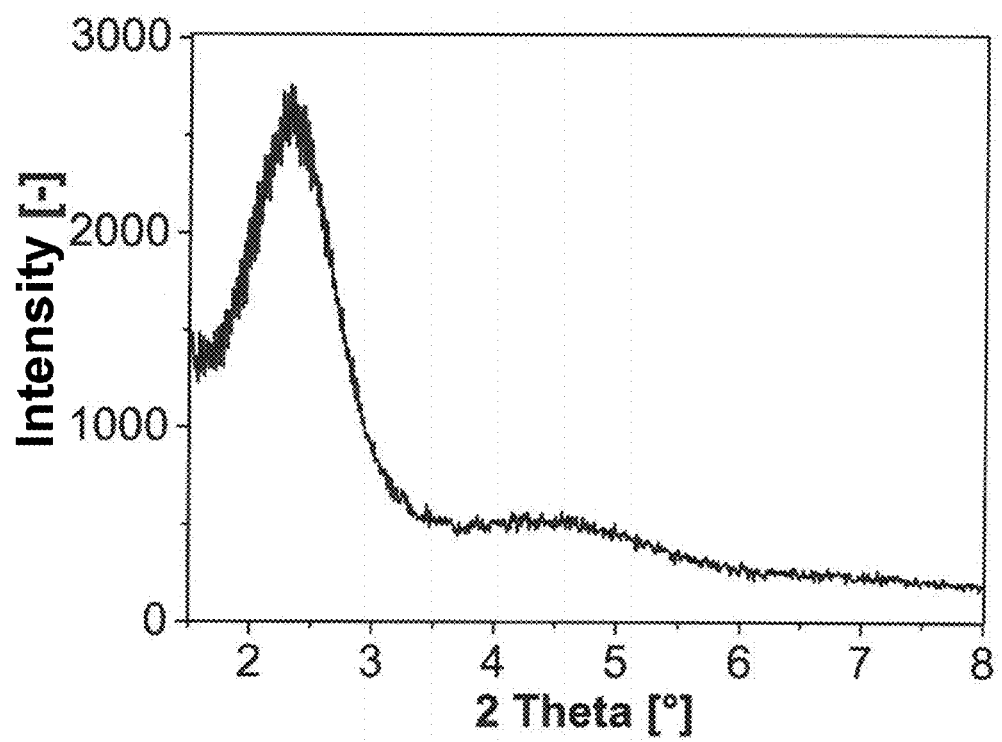
FIG. 4 shows an X-ray diffractogram of the calcined mesoporous silicon dioxide particles of Example 2.
Figure 5:
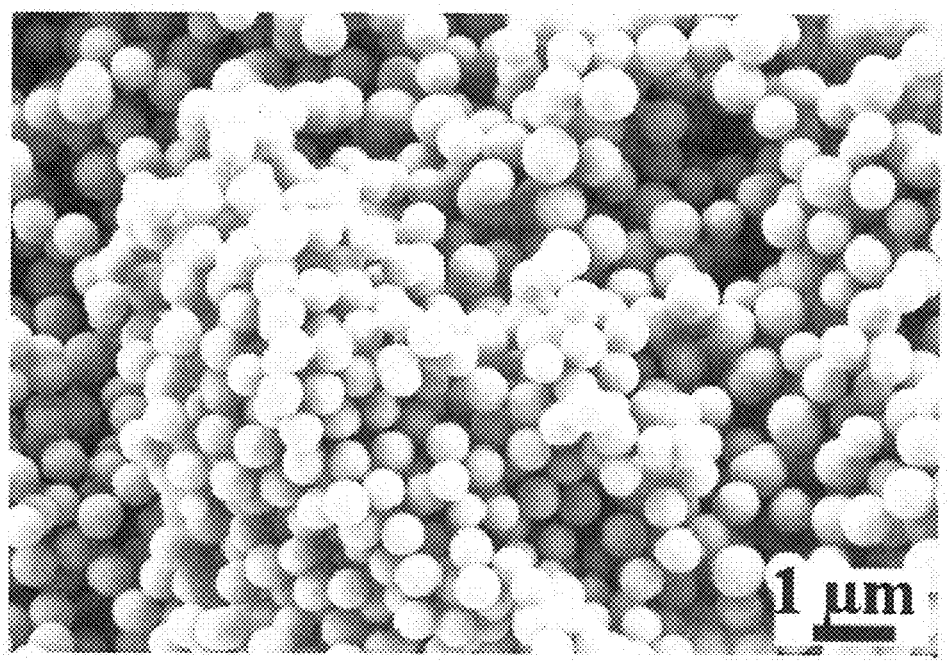
FIG. 5 shows a scanning electron microscope image of the calcined mesoporous silicon dioxide particles of Example 2.
Figure 6A:
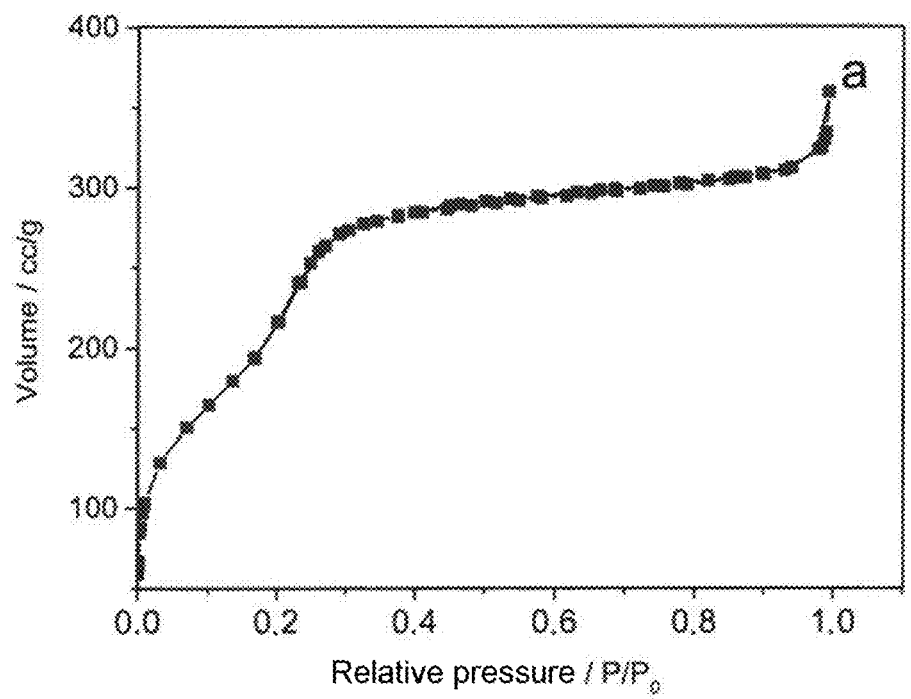
FIG. 6 shows the nitrogen sorption isotherm (a) and DFT pore size distribution (b) of the calcined mesoporous silicon dioxide particles of Example 2.
Figure 6B:
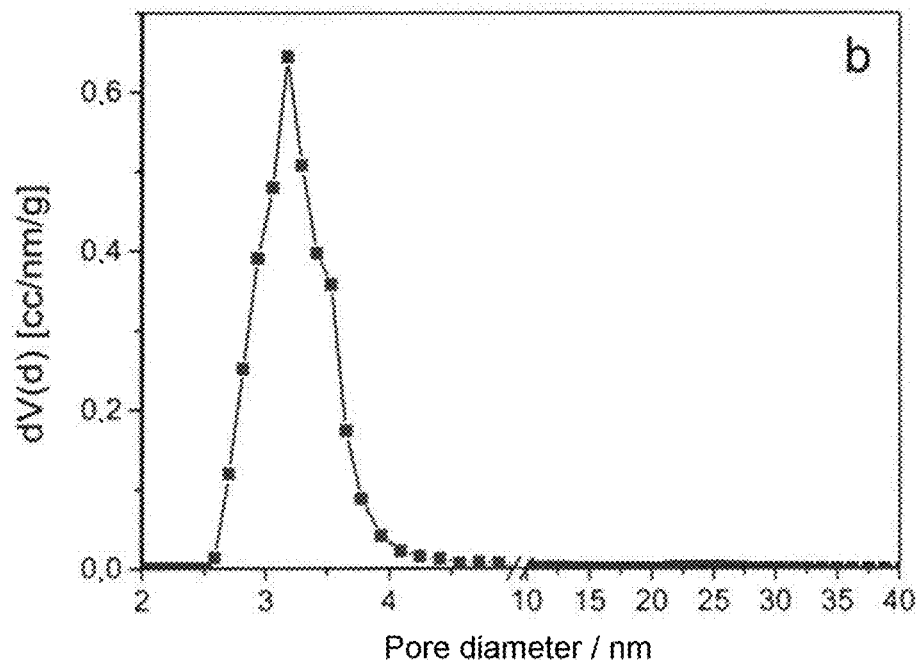
Figure 7:
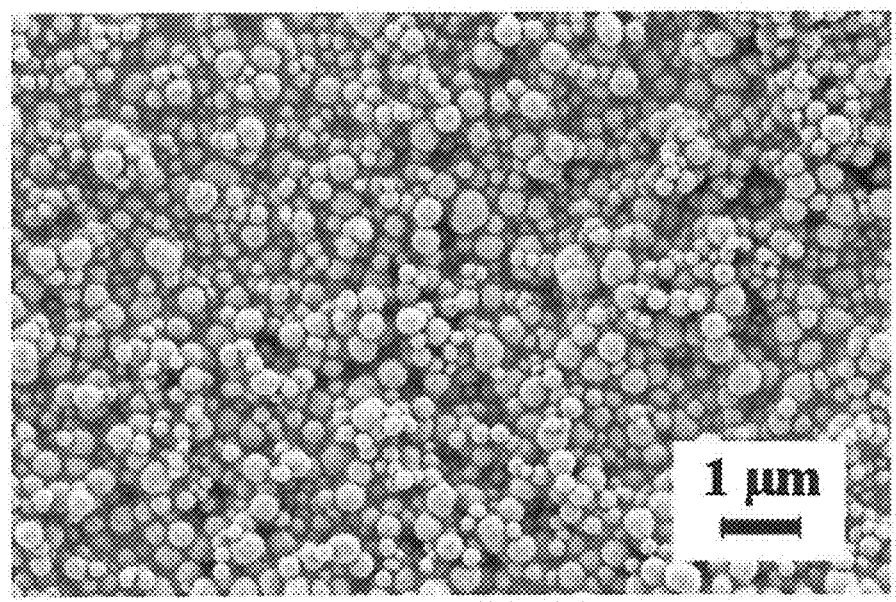
FIG. 7 shows a scanning electron microscope image of the calcined mesoporous silicon dioxide particles of Example 3.
Figure 8:
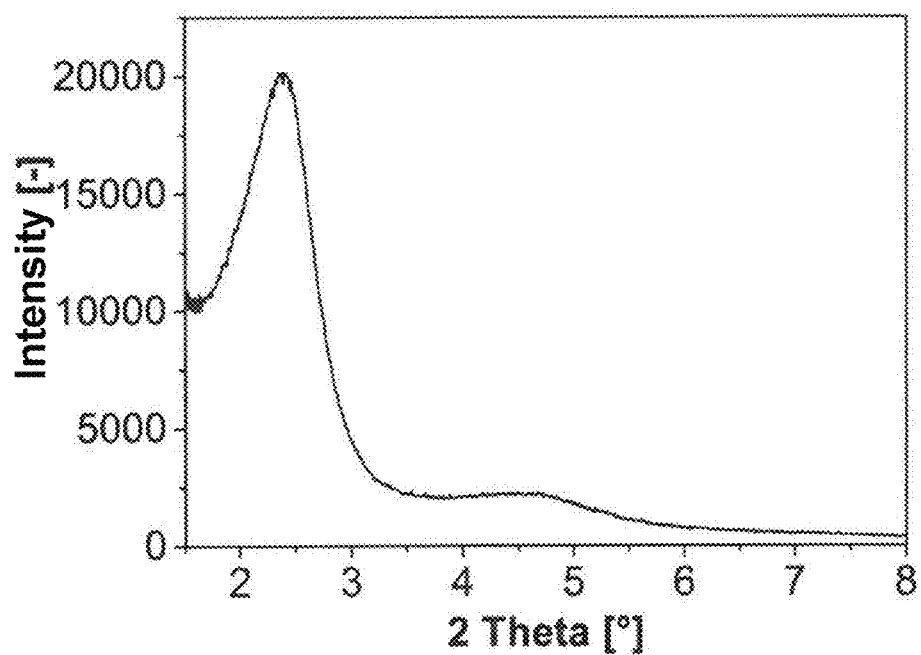
FIG. 8 shows an X-ray diffractogram of the calcined mesoporous silicon dioxide particles of Example 3.
Figure 9A:
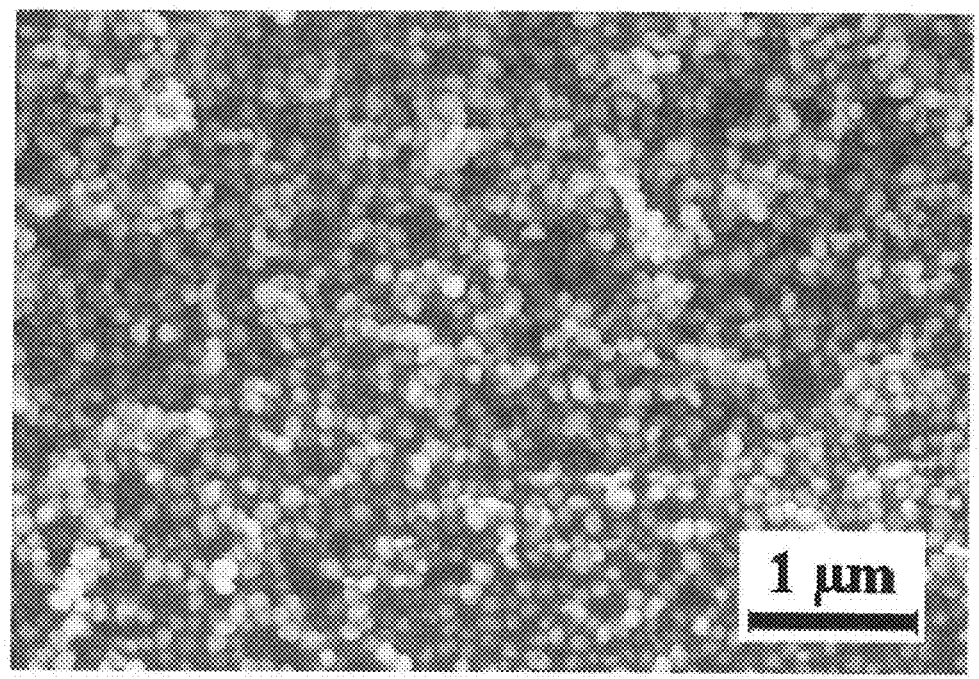
FIG. 9 shows a scanning electron microscope image (a) and an X-ray diffractogram (b) of the zeolite nanoparticles of the MFI type without aluminum according to Example 4 (according to the invention). As a comparison, an SEM image (FIG. 5) of a nanozeolite of the MFI type produced according to Example 1 (comparative example) is shown.
Figure 9B:
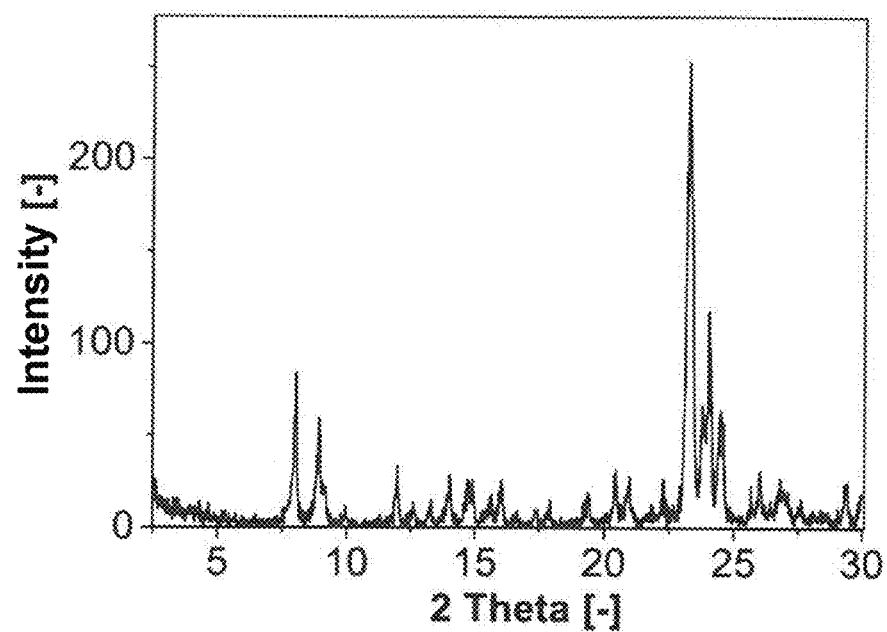
Figure 10:
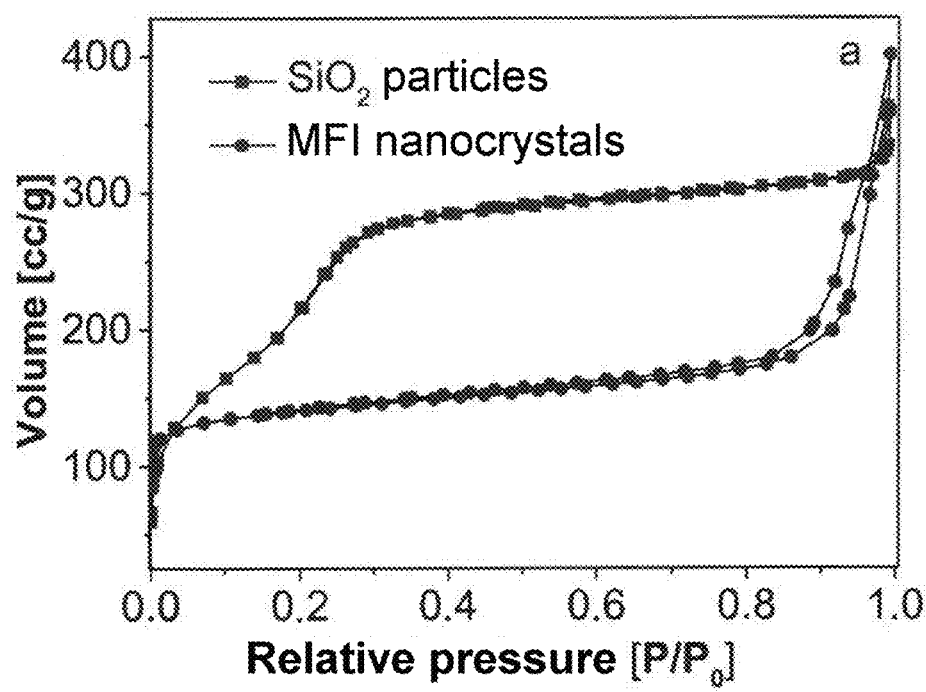
FIG. 10 shows the nitrogen sorption isotherm of the calcined mesoporous silicon dioxide particles and the zeolite nanoparticles of the MFI type without aluminum according to Example 4.
Figure 11:
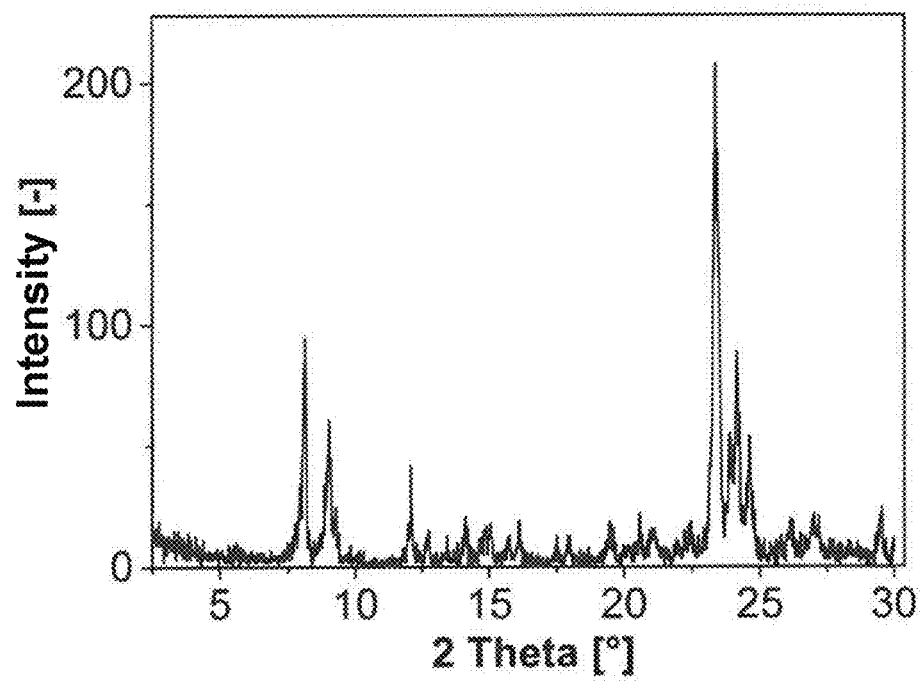
FIG. 11 shows an X-ray diffractogram of the aluminum-containing zeolitic nanoparticles of the MFI type of Example 5.
Figure 12:
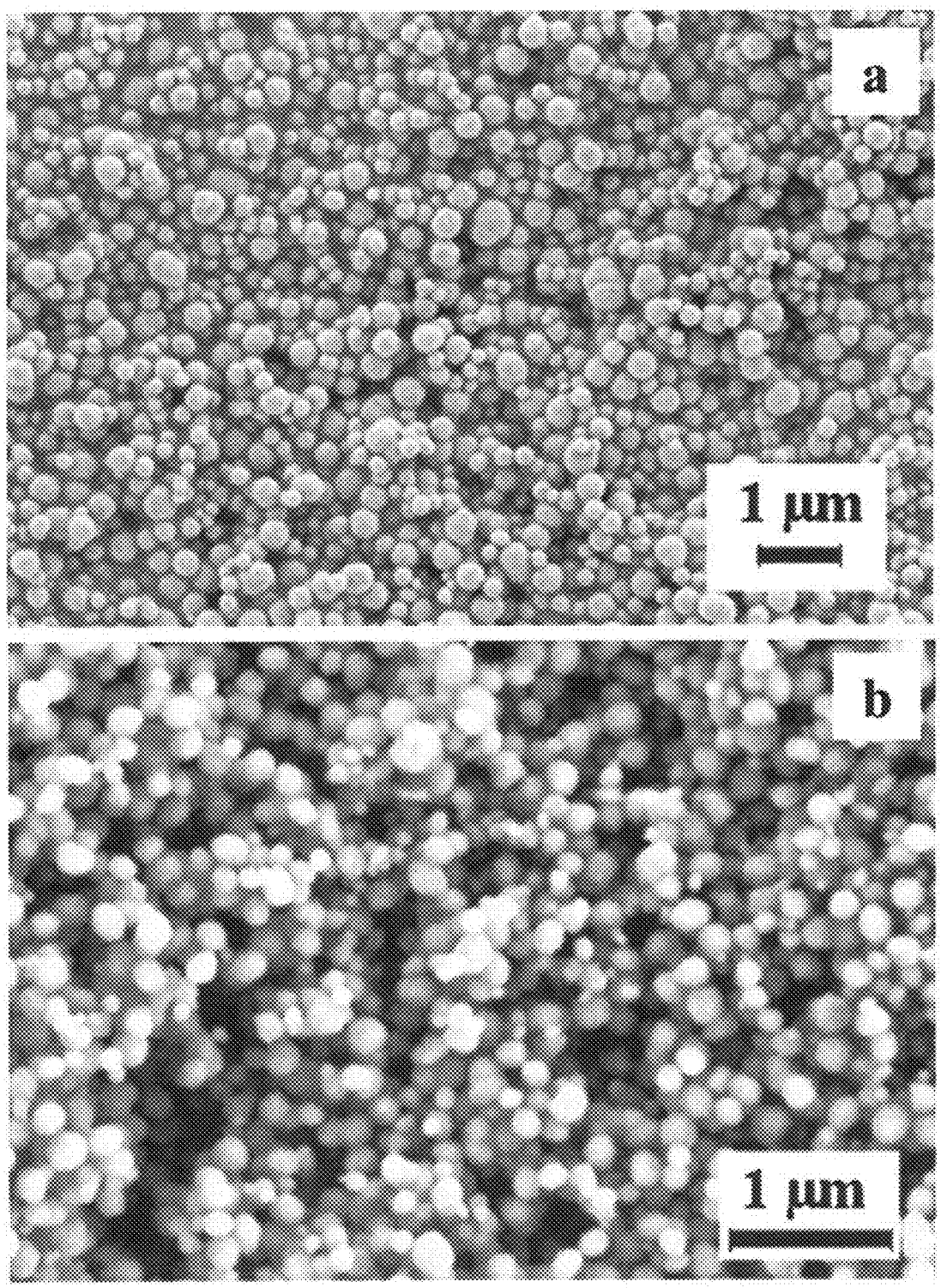
FIG. 12 shows a scanning electron microscope image of the aluminum-containing mesoporous silicon dioxide particles of Example 3 (a) and of the zeolitic nanoparticles of the MFI type (b) of Example 5.
Figure 13:
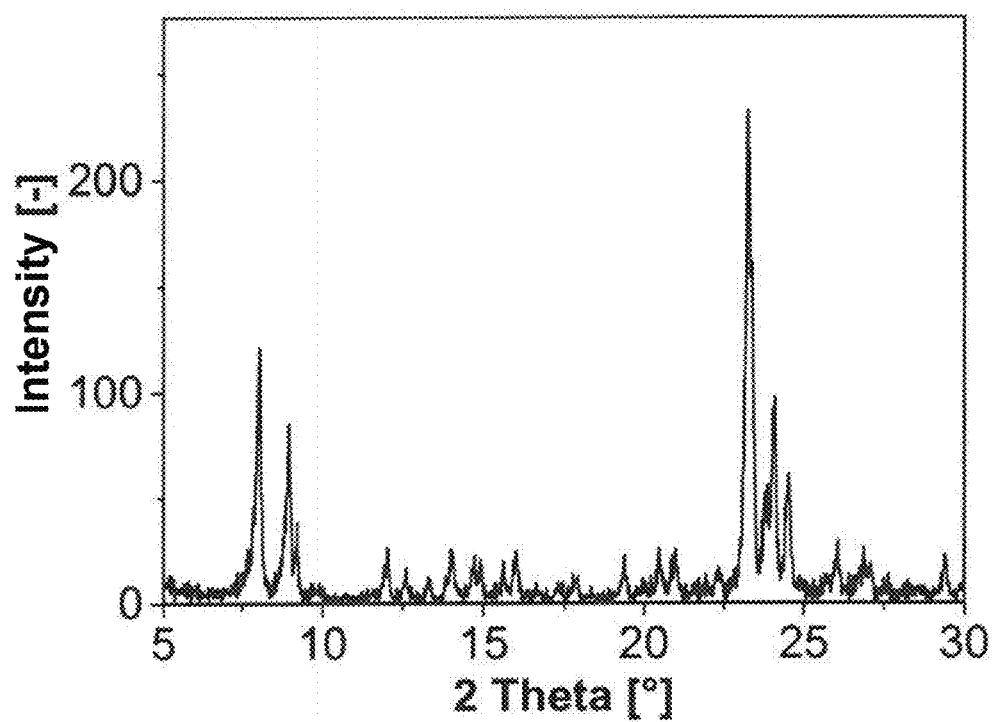
FIG. 13 shows an X-ray diffractogram of Nano-Pt/ZSM-5 of Example 6.
Figure 14:
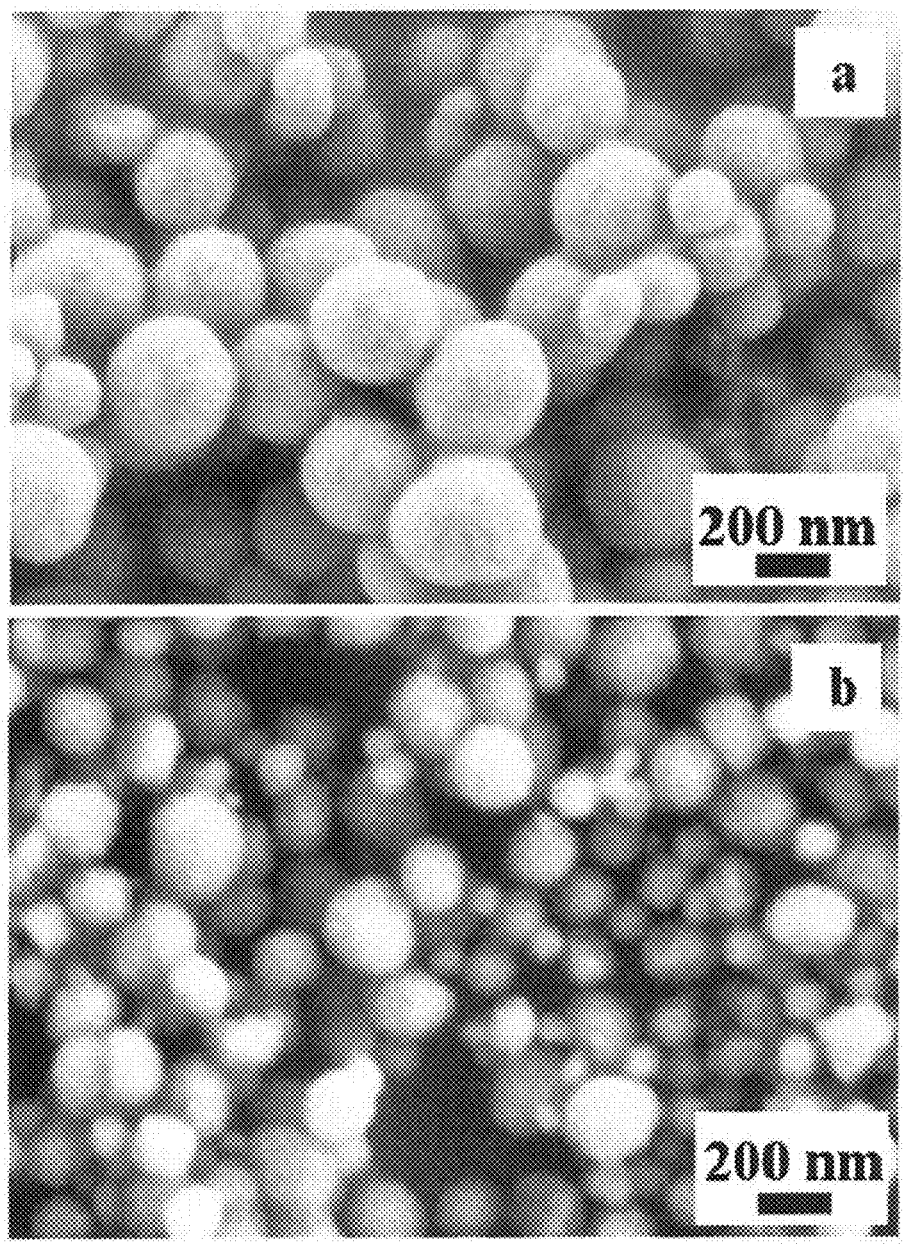
FIG. 14 shows a scanning electron microscope image of the aluminum-containing mesoporous silicon dioxide particles of Example 3 (a) and of the Nano-Pt/ZSM-5 particles (b) of Example 6.
Figure 15:
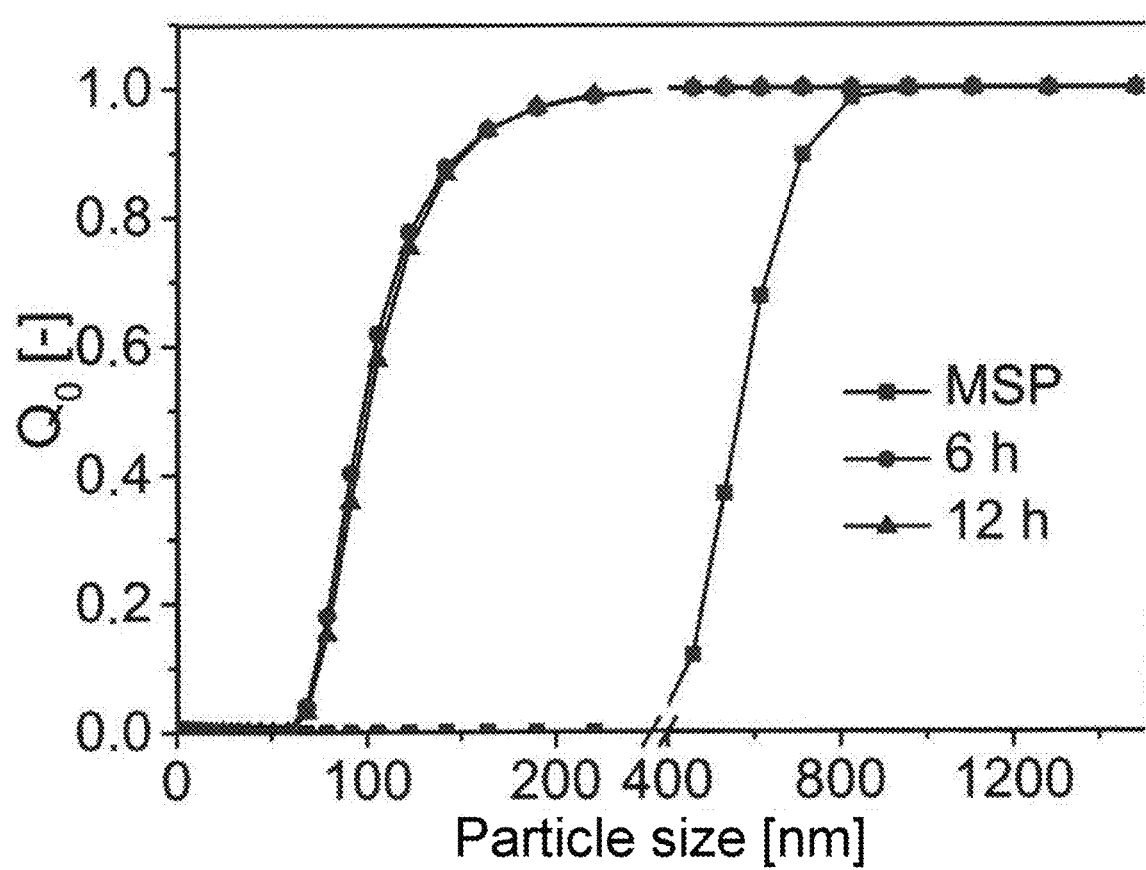
FIG. 15 shows the particle size distribution of the starting particles produced in Example 2 ("MSP") and of the nanoparticles obtained in Example 4 (with a conversion time in the autoclave of 6 and 12 h, respectively).

The invention claimed is:

1. A process for producing a particulate material which comprises zeolitic particles having a crystalline structure, wherein the particles contain 60 wt % or more of a zeolite material having a microporous zeolitic framework structure formed from Si, O and optionally Al, and/or a zeolite-like material having a microporous zeolitic framework structure which is formed not only from Si, O and optionally Al, wherein the zeolitic particles are in the form of particles with nanometer dimensions, and wherein at least 90% of all zeolitic particles, based on a number of particles, have a particle size of 20 to 500 nm, characterized in that the process comprises the following steps:
   a) providing a starting material comprising amorphous porous starting particles, which are composed of at least one oxide that can form a zeolite material having a zeolitic framework structure or a zeolite-like material having a zeolitic framework structure;
   b) introducing a solution or dispersion of an organic compound in a solvent, wherein the organic compound functions as a template for the synthesis of a zeolitic framework structure, into the pores of the amorphous porous starting particles, and subsequently fully or partially removing the solvent of the solution or dispersion, so that the organic compound remains in the pores throughout the amorphous porous starting particles and is also present in pores at the center of the porous starting particles;
   c) converting the material obtained in step b), which contains the amorphous porous starting particles with the organic compound in the pores, by heating the starting material in contact with steam so that the zeolitic particles are formed.

2. The process as claimed in claim 1, wherein the zeolitic particles are in the form of spherical particles with nanometer dimensions, wherein at least 90% of the amorphous porous starting particles of the starting material, expressed in terms of a number of particles, have a particle size of between 100 nm and 1000 nm.

3. The process as claimed in claim 1, wherein the pore volume of the pores with a diameter of 1 nm or more in the amorphous porous starting particles of the starting material lies in the range of from 0.2 to 2.0 ml/g, expressed in terms of the weight of the amorphous porous starting particles.

4. The process as claimed in claim 1, wherein the introduction of the solution or dispersion in step b) is carried out such that the solution or dispersion penetrates into all pores that are open toward the particle surface, with a diameter of 1 nm or more, of the amorphous porous starting particles of the starting material.

5. The process as claimed in claim 1, wherein a fill factor of the pores with a diameter of 1 nm or more of the amorphous porous starting particles obtained in step b) with the organic compound, defined as the ratio of the volume of the organic compound contained in the pores and the pore volume of mesopores of the particles, is from 50 to 100%.

6. The process as claimed in claim 1, wherein a metal compound is additionally introduced into the pores of the amorphous porous starting particles of the starting material in step b).

7. The process as claimed in claim 1, wherein the organic compound is a tetraorganoammonium cation or a tetraorganophosphonium cation.

* * * * *